(12) United States Patent  
Joao

(10) Patent No.: US 7,253,731 B2  
(45) Date of Patent: Aug. 7, 2007

(54) APPARATUS AND METHOD FOR PROVIDING SHIPMENT INFORMATION

(76) Inventor: Raymond Anthony Joao, 122 Bellevue Pl., Yonkers, NY (US) 10703

(*) Notice: Subject to any disclaimer, the term of this patent is extended or adjusted under 35 U.S.C. 154(b) by 724 days.

(21) Appl. No.: 10/055,116

(22) Filed: Jan. 22, 2002

(65) Prior Publication Data

US 2002/0099567 A1    Jul. 25, 2002

Related U.S. Application Data

(60) Provisional application No. 60/263,877, filed on Jan. 23, 2001.

(51) Int. Cl.
*G08B 1/08* (2006.01)

(52) U.S. Cl. .............. 340/539.13; 340/568.1; 340/572.1

(58) Field of Classification Search ............ 414/803, 414/340; 211/189; 235/462.46; 340/573.1, 340/425.5, 426.16, 426.17, 426.13, 438, 340/539.11, 539.14, 539.13, 539, 991, 539.22, 340/539.26, 588, 686.1, 689, 988, 572.1, 340/10.1, 539.1; 342/357.01, 426.22; 700/226, 700/90, 115; 705/5, 7, 11, 14, 28, 29; 707/102
See application file for complete search history.

(56) References Cited

U.S. PATENT DOCUMENTS

| | | | | |
|---|---|---|---|---|
| 3,669,288 A | * | 6/1972 | Young | .......... 414/803 |
| 4,828,315 A | | 5/1989 | Muirhead | |
| 4,911,493 A | | 3/1990 | Muirhead | |
| 5,137,322 A | | 8/1992 | Muirhead | |
| 5,317,323 A | * | 5/1994 | Kennedy et al. | ........... 342/457 |
| 5,512,902 A | | 4/1996 | Guthrie et al. | |
| 5,559,511 A | | 9/1996 | Ito et al. | |
| 5,577,689 A | | 11/1996 | Haro | |
| 5,594,740 A | | 1/1997 | LaDue | |
| 5,640,442 A | | 6/1997 | Fitzgerald et al. | |
| 5,712,789 A | | 1/1998 | Radican | |
| 5,729,217 A | | 3/1998 | Ito et al. | |
| 5,732,074 A | | 3/1998 | Spaur et al. | |

(Continued)

FOREIGN PATENT DOCUMENTS

FR       2816434 A1 *   5/2002

OTHER PUBLICATIONS

"Envirokare announces letter of intent with Electroship . . . " 2 page Envirokare press release dated Jul. 25, 2000.*

(Continued)

*Primary Examiner*—Van T. Trieu
(74) *Attorney, Agent, or Firm*—Raymond A. Joao, Esq.

(57) ABSTRACT

An apparatus, including a shipment conveyance device, associated with a shipment, which is a shipping a container, pallet, or tote, a memory device, located at the shipment conveyance device, in which information regarding the shipment is stored, a global positioning device, located at the shipment conveyance device, which determines a position or location of the shipment conveyance device, a processing device which processes information regarding the shipment and/or shipment conveyance device in response to an occurrence of an event or in response to a request for information and generates a message containing information regarding the position or location of the shipment conveyance device and information regarding the occurrence of an event, a status of the shipment, a shipment temperature, or an impact or force on the shipment conveyance device, and a transmitter, located at the shipment conveyance device, which transmits the message to a communication device.

30 Claims, 9 Drawing Sheets

U.S. PATENT DOCUMENTS

| | | | |
|---|---|---|---|
| 5,734,963 A | 3/1998 | Fitzgerald et al. | |
| 5,751,245 A | 5/1998 | Janky et al. | |
| 5,758,313 A | 5/1998 | Shah et al. | |
| 5,774,876 A | 6/1998 | Woolley et al. | |
| 5,802,454 A | 9/1998 | Goshay et al. | |
| 5,821,880 A | 10/1998 | Morimoto et al. | |
| 5,825,283 A * | 10/1998 | Camhi | 340/438 |
| 5,835,377 A | 11/1998 | Bush | |
| 5,877,707 A * | 3/1999 | Kowalick | 340/457.1 |
| 5,917,405 A * | 6/1999 | Joao | 340/426.17 |
| 5,917,434 A * | 6/1999 | Murphy | 340/991 |
| 5,939,982 A | 8/1999 | Gagnon et al. | |
| 5,999,808 A | 12/1999 | LaDue | |
| 6,001,065 A | 12/1999 | DeVito | |
| 6,044,990 A * | 4/2000 | Palmeri | 211/189 |
| 6,046,678 A * | 4/2000 | Wilk | 340/686.1 |
| 6,148,291 A * | 11/2000 | Radican | 706/28 |
| 6,281,797 B1* | 8/2001 | Forster et al. | 340/572.3 |
| 6,292,828 B1* | 9/2001 | Williams | 709/218 |
| 6,294,114 B1 | 9/2001 | Muirhead | |
| 6,332,098 B2* | 12/2001 | Ross et al. | 700/226 |
| 6,340,194 B1 | 1/2002 | Muirhead et al. | |
| 6,463,272 B1 | 10/2002 | Wallace et al. | |
| 6,464,142 B1* | 10/2002 | Denenberg et al. | 235/462.46 |
| 6,474,927 B1* | 11/2002 | McAdams et al. | 414/340 |
| 6,531,982 B1 | 3/2003 | White et al. | |
| 6,542,076 B1* | 4/2003 | Joao | 340/425.5 |
| 6,542,077 B2* | 4/2003 | Joao | 340/426.16 |
| 6,549,130 B1* | 4/2003 | Joao | 340/425.5 |
| 6,577,921 B1 | 6/2003 | Carson | |
| 6,587,046 B2* | 7/2003 | Joao | 340/539.14 |
| 6,588,826 B1 | 7/2003 | Muirhead | |
| 6,610,954 B2* | 8/2003 | Takizawa | 209/583 |
| 6,616,103 B2 | 9/2003 | Marrero | |
| 6,631,271 B1 | 10/2003 | Logan | |
| 6,661,339 B2 | 12/2003 | Muirhead | |
| 6,700,493 B1 | 3/2004 | Robinson | |
| 6,718,888 B2 | 4/2004 | Muirhead | |
| 6,749,418 B2 | 6/2004 | Muirhead | |
| 6,785,718 B2 | 8/2004 | Hancock et al. | |
| 6,844,473 B1* | 1/2005 | Quinlin et al. | 340/439 |
| 6,943,678 B2 | 9/2005 | Muirhead | |
| 6,988,079 B1 | 1/2006 | Or-Bach et al. | |
| 6,989,751 B2 | 1/2006 | Richards | |
| 6,996,402 B2 | 2/2006 | Logan et al. | |
| 7,013,026 B2 | 3/2006 | Takehara et al. | |
| 7,020,701 B1 | 3/2006 | Gelvin et al. | |
| 7,035,856 B1 | 4/2006 | Morimoto | |
| 7,136,832 B2 | 11/2006 | Li et al. | |
| 7,155,264 B2 | 12/2006 | Twitchell, Jr. | |
| 7,164,117 B2 | 1/2007 | Breed et al. | |
| 2001/0029874 A1 | 10/2001 | Muirhead | |
| 2001/0038225 A1 | 11/2001 | Muirhead | |
| 2002/0016655 A1* | 2/2002 | Joao | 340/438 |
| 2002/0017996 A1* | 2/2002 | Niemiec | 340/573.1 |
| 2002/0030297 A1 | 3/2002 | Muirhead | |
| 2002/0049622 A1* | 4/2002 | Lettich et al. | 705/7 |
| 2002/0058082 A1 | 5/2002 | Muirhead | |
| 2002/0113694 A1 | 8/2002 | Muirhead | |
| 2002/0116318 A1* | 8/2002 | Thomas et al. | 705/37 |
| 2002/0121969 A1* | 9/2002 | Joao | 340/425.5 |
| 2002/0198774 A1* | 12/2002 | Weirich | 705/14 |
| 2003/0009361 A1* | 1/2003 | Hancock et al. | 705/7 |
| 2003/0016130 A1* | 1/2003 | Joao | 340/539 |
| 2003/0067541 A1* | 4/2003 | Joao | 348/148 |
| 2003/0071899 A1* | 4/2003 | Joao | 348/148 |
| 2003/0084125 A1* | 5/2003 | Nagda et al. | 702/219 |
| 2003/0193404 A1* | 10/2003 | Joao | 340/825.71 |
| 2003/0206102 A1* | 11/2003 | Joao | 340/539.1 |
| 2004/0160319 A1* | 8/2004 | Joao | 340/539.1 |
| 2004/0168618 A1 | 9/2004 | Muirhead | |
| 2004/0230601 A1* | 11/2004 | Joao et al. | 707/102 |
| 2005/0171835 A1* | 8/2005 | Mook et al. | 705/11 |
| 2005/0237184 A1 | 10/2005 | Muirhead | |
| 2005/0241548 A1 | 11/2005 | Muirhead | |
| 2005/0248444 A1* | 11/2005 | Joao | 340/426.13 |
| 2005/0258955 A1 | 11/2005 | Gloekler et al. | |
| 2006/0243174 A1 | 11/2006 | Muirhead | |
| 2006/0270759 A1 | 11/2006 | Muirhead et al. | |

OTHER PUBLICATIONS

"Technology Exexcutive . . . joins Envirokare as president and Director", 2 page Envirokare press release dated Sep. 5, 2000.*
"Envirokare Tech Inc. announces additions to advissory board", 3 page Envirokare press release dated Sep. 7, 2000.*
U.S. Appl. No. 60/177,383, filed Jan. 24, 2004, Muirhead.
U.S. Appl. No. 60/196,127, filed Apr. 11, 2000, Muirhead.
U.S. Appl. No. 60/097,200, filed Aug. 20, 1998, Muirhead.
U.S. Appl. No. 60/286,450, filed Apr. 27, 2001, Muirhead.
U.S. Appl. No. 60/140,741, filed Jun. 25, 1999, Muirhead et al.
U.S. Appl. No. 60/185,852, filed Feb. 29, 2000, Muirhead.
U.S. Appl. No. 11/510,464, filed Aug. 25, 2006, Muirhead.
U.S. Appl. No. 60/533,329, filed Dec. 30, 2003, Foskett et al.

* cited by examiner

APPARATUS AND METHOD FOR PROVIDING SHIPMENT INFORMATION

RELATED APPLICATIONS

This application claims the benefit of priority of U.S. Provisional patent application Ser. No. 60/263,877, filed Jan. 23, 2001, and entitled "APPARATUS AND METHOD FOR PROVIDING SHIPMENT INFORMATION", the subject matter of which is hereby incorporated by reference herein.

FIELD OF THE INVENTION

The present invention pertains to an apparatus and method for providing shipment information and, in particular, to an apparatus and method for providing shipment information which can be attached to, integrated with, located and/or positioned on, and/or located and/or positioned in, a shipment conveyance device, a pallet, a container, a tote, and/or any shipment conveyance structure or apparatus.

BACKGROUND OF THE INVENTION

The shipping, delivery, and freight, services industries account for billions of dollars in revenues annually. Billions of dollars are spent each year in shipping and/or delivering goods, products, items, and/or other objects, which are the subject of commercial as well as non-commercial transactions. In recent years, the growth of electronic commerce and electronic retailers (so called "e-tailers") has only increased the need for shipping, delivery, and/or freight delivery, services.

In a great majority of instances, shipped or delivered goods, products, items, and/or other objects, are shipped in shipping containers, on pallets, in cargo containers, in boxes, in envelopes, and/or in totes. Senders or receivers of shipped goods, products, items, and/or other objects, have only very limited means available to them for obtaining shipment information regarding shipments in transit and/or in the possession of a carrier or transporter.

In this ever-growing information age, the ability to have information available at one's fingertips, and/or in an instant, continues to fuel the desire to have more and more information accessible upon demand. With an ever-increasing amount of goods, products, items, and/or objects, being the subject of shipments and/or deliveries, there is no doubt that tremendous value can be found in allowing a sender, a carrier, or a receiver, of a shipment or delivery, to obtain information regarding the respective shipment or delivery while the respective shipment or delivery is in progress and/or shortly thereafter.

Many goods, products, items, and/or objects, are shipped or delivered on, or in, reusable shipping conveyance devices, pallets, containers, boxes, envelopes, and/or totes. Presently, there appears to be no system or device available which can facilitate providing shipment information, regarding a shipment or delivery, to interested parties.

SUMMARY OF THE INVENTION

The present invention pertains to an apparatus and method for providing shipment information which overcomes the shortfalls of the prior art. The present invention provides and apparatus and method for providing shipment information which can be attached to, integrated with, located and/or positioned on, and/or located and/or positioned in, a shipment conveyance device, a pallet, a container, a tote, and/or any shipment conveyance structure or apparatus.

The present invention also provides an apparatus and method for providing and/or for processing information regarding a shipment of goods, products, items, entities, objects, and/or any other entities which can be shipped and/or transported via any of the herein-described shipment conveyance devices, pallets, containers, totes, and/or any shipment conveyance structures or apparatuses.

The present invention can be utilized on, positioned on, positioned in, located on, located in, integrated with, built-into, or utilized in conjunction with, any of the herein-described shipment conveyance devices, pallets, containers, totes, and/or any shipment conveyance structures or apparatuses.

The present invention also provides a system for utilizing the apparatus and method of the present invention in conjunction with a carrier computer, a sender or shipping entity computer, a receiver or receiving entity computer, and/or a central processing computer, for facilitating use of the apparatus and method of the present invention in a network environment.

The present invention can be utilized in conjunction with shipment conveyance devices, pallets, containers, totes, and/or any shipment conveyance structures or apparatuses, of any size, kind, or type.

The present invention includes a shipment conveyance device, a pallet, a container, a tote, and/or any shipment conveyance structure, and a shipment conveyance device computer.

The present invention can also include a carrier computer or communication device which is associated with the carrier which is utilized to transport the shipment conveyance device.

The present invention can also include a sender or shipping entity computer or communication device which is associated with the a sender or shipping entity who or which is effecting shipment of the respective goods, products, items, entities, objects, and/or any other entities, which can be shipped on, in, or in conjunction with, the shipment conveyance devices.

The present invention also includes a receiver or receiving entity computer or communication device which is associated with the a receiver or receiving entity who or which is receiving shipment of the respective goods, products, items, entities, objects, and/or any other entities, which can be shipped on, in, or in conjunction with, the shipment conveyance devices.

The present invention can also include a central processing computer which can be utilized to administer, manage, and/or control, the operation of the system and/or any of the shipment conveyance device computers, the carrier computers, the sender computers, and/or the receiver computers.

The shipment conveyance device computers, carrier computers, sender computers, receiver computers, and/or central processing computers, can communicate with, transmit information to, and/or receive information from, any shipment conveyance device computers, carrier computers, sender computers, receiver computers, and/or central processing computers, over any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

The present invention can be utilized on, over, and/or in conjunction with, any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

Any of the shipping conveyance device computers, the carrier computers, the sender computers, the receiver computers, and/or the central processing computers, can include, a central processing unit (CPU), a random access memory (RAM), a read only memory (ROM), an input device, a reading or scanning device, a display device, a receiver, a transmitter, a database, and an output device, and/or any other devices needed and/or desired for performing the functions of the respective computers.

The shipment conveyance device computer can also include a global positioning device which can be utilized in order to determine the position and/or location of the shipment conveyance device computer. The shipment conveyance device computer can also include a sensor device which be utilized in order to monitor and/or to measure temperature, impact forces, and/or other environmental activity and/or other activity involving the shipment conveyance device computer.

The present invention can be utilized on, in, and/or in conjunction with shipment conveyance devices, pallets, containers, refrigerated containers, protective containers, totes, boxes, envelopes, bags, canvas bags, and/or any shipment conveyance structures or apparatuses, of any size, kind, or type.

The present invention can be utilized on, in, and/or in conjunction with, shipment conveyance devices can also be cargo containers or any type, kind, shape, or size, which can be utilized trucks, cars, vehicles, trains, boats, ships, marine vessels, aircraft, airplanes, of any kind or type for performing ground, sea and air, transport. The shipping conveyance device computer can be attached to, built into, integrated with, and/or placed inside, the shipping conveyance device.

The present invention can be utilized in order to provide information regarding a shipment or delivery to any one or more of a carrier or transporter of the shipment, to the receiver or receiving entity of the shipment, and/or to the central processing computer and/or to the operator or administrator of the present invention.

The present invention can also be utilized in order to access the shipment conveyance device computer, via any one or more of the respective carrier computer(s), sender computer(s), receiver computer(s), and/or the central processing computer(s), and to obtain information regarding the shipment from the shipment conveyance device computer.

The present invention can also provide location information and/or position information regarding the shipment. The present invention can also provide status updates to any one or more of the carrier, the sender, the receiver, and/or an administrator, regarding the shipment.

The present invention can also generate status messages which can contain information regarding the shipment. The present invention can also transmit the status messages to any of the respective carrier computers, the sender computer(s), the receiver computer(s), and/or the central processing computer(s)

Upon the delivery of the shipment, the present invention can be utilized in order to access and obtain information from the shipment conveyance device computer.

The present invention can also generate a shipment delivery message and transmit same to any one or more of the carrier computer(s), the sender computer(s), the receiver computer(s), and/or the central processing computer(s).

The present invention can also be utilized in order to provide notification to any one or more of a sender, a carrier, a receiver, and/or an administrator, of any one or more of a lost shipment, an off-track shipment, a delayed shipment, a damaged shipment, and/or a mis-delivered shipment.

The present invention can await the detection of a processing event and generate an appropriate notification message in order to provide notification to any one or more of the carrier, the sender, the receiver, and/or the administrator, of the detected processing event.

In another preferred embodiment, the apparatus and method of the present invention can be utilized in order to verify that a shipment is being delivered to the proper receiver.

The present invention can determine whether a receiver is the correct receiver for receiving the shipment. If the receiver is not the correct receiver of the shipment, the present invention can generate an appropriate signal or stimulus which can be provided to the receiver or the carrier. The present invention can also cancel the delivery and generate and transmit, to a respective party or parties, a mis-delivered notification message indicating that the receiver is not the correct receiver.

If the present invention determines that the receiver is the correct receiver, the present invention can generate an appropriate signal or stimulus which can be provided to the receiver or the carrier. The present invention can also generate a delivery notification message and transmit same, to a respective party or parties, indicating that the receiver is the correct receiver and/or that delivery of the shipment has been effected.

The present invention can also be utilized in order to generate and/or process information regarding an insurance claim involving a shipment which has been lost, stolen, damaged, and/or mis-delivered, during shipment, transport, and/or delivery, by the carrier.

The present invention can await the detection of a processing event which can lead to the filing of an insurance claim regarding or relating to the shipment. The present invention can detect the processing event, process information regarding same and/or relating to same, and generate an insurance claim message which contains information regarding the processing event and information for filing an appropriate insurance claim.

The present invention can also transmit the insurance claim message to any one or more of the carrier, the sender, the receiver, and/or the administrator. The present invention can also transmit the insurance claim message to any one or more of the carrier computer, the sender computer, the receiver computer, and/or the central processing computer.

Accordingly, it is an object of the present invention to provide an apparatus and method for providing shipment information.

It is another object of the present invention to provide an apparatus and method for providing shipment information which can be attached to, integrated with, located and/or positioned on, and/or located and/or positioned in, a shipment conveyance device, a pallet, a container, a tote, and/or any shipment conveyance structure or apparatus.

It is still another object of the present invention to provide an apparatus and method for providing shipment information which can process information regarding a shipment of goods, products, items, entities, objects.

It is yet another object of the present invention to provide an apparatus and method for providing shipment information which can process information regarding a shipment of goods, products, items, entities, objects which can be shipped and/or transported via shipment conveyance devices, pallets, containers, totes, and/or any shipment conveyance structures or apparatuses.

It is another object of the present invention to provide an apparatus and method for providing shipment information which provides a system for utilizing the apparatus and method of the present invention.

It is still another object of the present invention to provide an apparatus and method for providing shipment information which provides a system for utilizing the apparatus and method of the present invention in conjunction with a carrier computer, a sender or shipping entity computer, a receiver or receiving entity computer, and/or a central processing computer.

It is yet another object of the present invention to provide an apparatus and method for providing shipment information in a network environment.

It is another object of the present invention to provide an apparatus and method for providing shipment information which can be utilized in conjunction with shipment conveyance devices, pallets, containers, totes, and/or any shipment conveyance structures or apparatuses, of any size, kind, or type.

It is still another object of the present invention to provide an apparatus and method for providing shipment information which can be utilized on, or over, any one or more of a telephone network, a telecommunication network, a digital communication network, a satellite communication network, a wireless communication network, a personal communication services network, a broadband communication network, a bluetooth communication network, and/or any communication network.

It is yet another object of the present invention to provide an apparatus and method for providing shipment information which can be utilized on, or over, the Internet and/or the World Wide Web.

It is another object of the present invention to provide an apparatus and method for providing shipment information which can be utilized in conjunction with a global positioning system.

It is still another object of the present invention to provide an apparatus and method for providing shipment information which can be utilized in conjunction with a locating and/or positioning system.

It is yet another object of the present invention to provide an apparatus and method for providing shipment information which can be utilized to determine the position and/or location of a shipment.

It is another object of the present invention to provide an apparatus and method for providing shipment information which can be utilized to determine the position and/or location of the a shipment conveyance device or a shipment conveyance device computer.

It is still another object of the present invention to provide an apparatus and method for providing shipment information which can be utilized to monitor and/or to measure temperature, impact forces, and/or other environmental activity and/or other activity involving the a shipment, a shipment conveyance device, or a shipment conveyance device computer.

It is yet another object of the present invention to provide an apparatus and method for providing shipment information which can be utilized in conjunction with any one or more of ground, land, rail, sea, water, and air, shipments or deliveries.

It is another object of the present invention to provide an apparatus and method for providing shipment information which can be utilized in order to provide information regarding a shipment to a sender of the shipment, to a carrier of the shipment, or a receiver of the shipment.

It is still another object of the present invention to provide an apparatus and method for providing shipment information which can be utilized in order to access a shipment conveyance device computer.

It is yet another object of the present invention to provide an apparatus and method for providing shipment information which can be utilized in order to access and obtain information from a shipment conveyance device computer.

It is another object of the present invention to provide an apparatus and method for providing shipment information which can provide status information, updates, or messages, regarding a shipment.

It is still another object of the present invention to provide an apparatus and method for providing shipment information which can provide status information, updates, or messages, regarding a shipment to a carrier, a sender, or a receiver, of a shipment.

It is yet another object of the present invention to provide an apparatus and method for providing shipment information which can provide shipment delivery information or messages regarding a shipment.

It is another object of the present invention to provide an apparatus and method for providing shipment information which can provide shipment delivery information or messages regarding a shipment to a carrier, a sender, or a receiver, of a shipment.

It is still another object of the present invention to provide an apparatus and method for providing shipment information which can provide notification of a lost shipment, an off-track shipment, a delayed shipment, a damaged shipment, or a mis-delivered shipment, to a sender, a carrier, or a receiver, of a shipment.

It is yet another object of the present invention to provide an apparatus and method for providing shipment information which can detect a processing event.

It is another object of the present invention to provide an apparatus and method for providing shipment information which can provide a notification message to a sender, carrier, or receiver, in response to a detection of a processing event.

It is still another object of the present invention to provide an apparatus and method for providing shipment information which can be utilized in order to verify that a shipment is being delivered to the correct receiver.

It is yet another object of the present invention to provide an apparatus and method for providing shipment information which can determine whether a receiver is the correct receiver for receiving a shipment.

It is another object of the present invention to provide an apparatus and method for providing shipment information which can cancel a delivery of a shipment upon determining that a receiver is not the correct receiver of a shipment.

It is still another object of the present invention to provide an apparatus and method for providing shipment information which provide information of a delivery of a shipment to a wrong party.

It is yet another object of the present invention to provide an apparatus and method for providing shipment information which can determine that a shipment is delivered to a correct party.

It is another object of the present invention to provide an apparatus and method for providing shipment information which provides a delivery notification message.

It is still another object of the present invention to provide an apparatus and method for providing shipment information which provides a delivery notification message to a sender, a carrier, or a receiver, of a shipment.

It is yet another object of the present invention to provide an apparatus and method for providing shipment information which provides information regarding an insurance claim involving a shipment which has been lost, stolen, damaged, and/or mis-delivered.

It is another object of the present invention to provide an apparatus and method for providing shipment information which can file an insurance claim regarding or relating to a shipment.

It is still another object of the present invention to provide an apparatus and method for providing shipment information which can detect a processing event which gives rise to a filing of an insurance claim It is yet another object of the present invention to provide an apparatus and method for providing shipment information which can provide an insurance claim message to a carrier, a sender, a receiver, or an insurer.

Other objects and advantages of the present invention will be apparent to those skilled in the art upon a review of the Description of the Preferred Embodiments taken in conjunction with the Drawings which follow.

DESCRIPTION OF THE PREFERRED EMBODIMENTS

Figure 1:
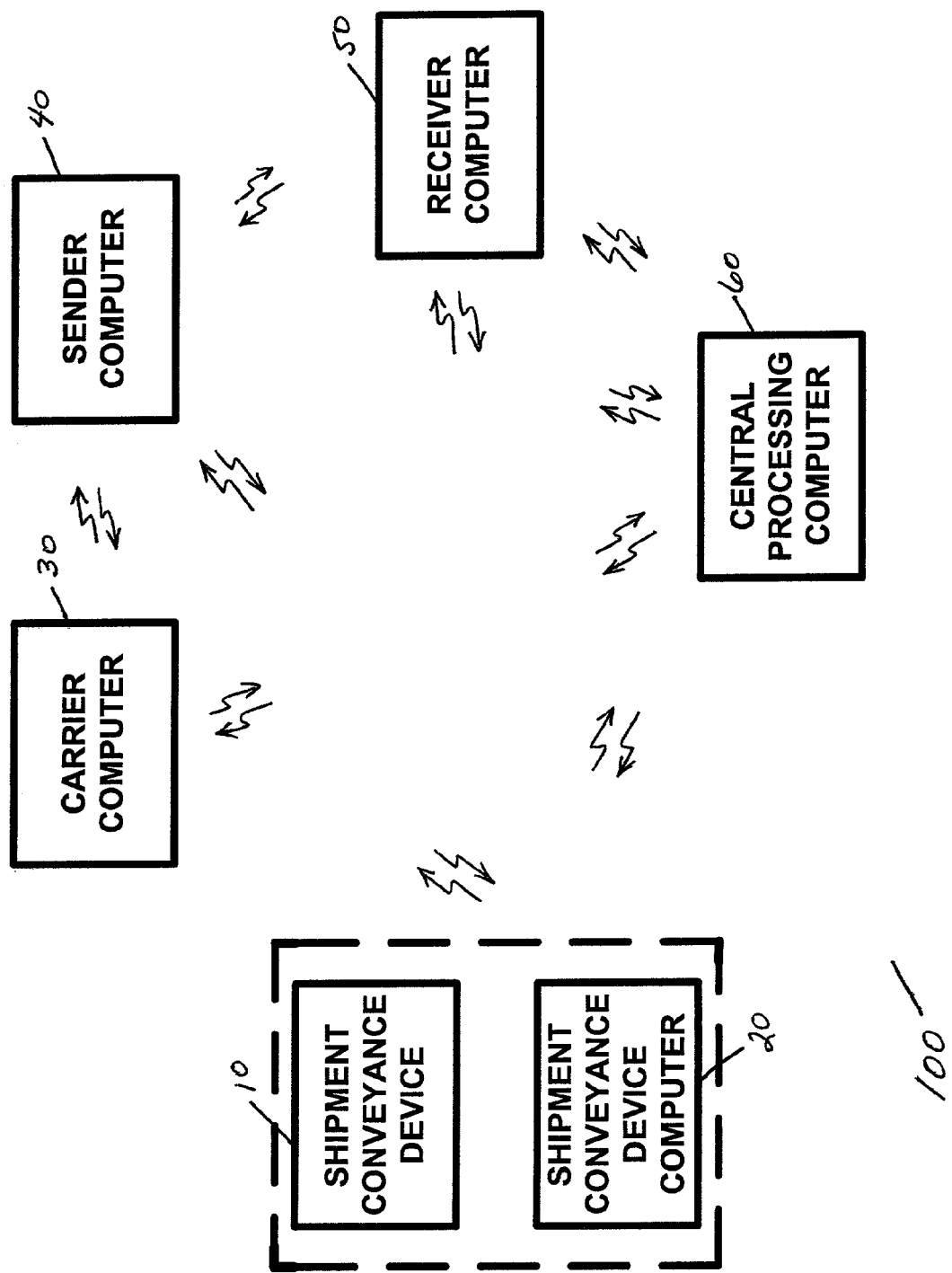
FIG. 1 illustrates a block diagram of the system in which the apparatus and method of the present invention can be utilized.

The present invention pertains to an apparatus and method for providing shipment information and, in particular, to an apparatus and method for providing shipment information which can be attached to, integrated with, located and/or positioned on, and/or located and/or positioned in, a shipment conveyance device, a pallet, a container, a tote, and/or any shipment conveyance structure or apparatus.

The present invention provides an apparatus and method for providing and/or for processing information regarding a shipment of goods, products, items, entities, objects, and/or any other entities which can be shipped and/or transported via any of the herein-described shipment conveyance devices, pallets, containers, totes, and/or any shipment conveyance structures or apparatuses.

The apparatus and method of the present invention can be utilized on, positioned on, positioned in, located on, located in, integrated with, built-into, or utilized in conjunction with, any of the herein-described shipment conveyance devices, pallets, containers, totes, and/or any shipment conveyance structures or apparatuses. In this manner, the present invention provides a shipment conveyance device, a pallet, a container, a tote, and/or any shipment conveyance structure or apparatus, which includes an apparatus for providing shipment information.

The present invention also provides a system for utilizing the apparatus and method of the present invention in conjunction with a carrier computer, a sender or shipping entity computer, a receiver or receiving entity computer, and/or a central processing computer, for facilitating use of the apparatus and method of the present invention in a network environment.

The present invention can be utilized in conjunction with shipment conveyance devices, pallets, containers, totes, and/or any shipment conveyance structures or apparatuses, of any size, kind, or type.

As used herein, the term "shipment conveyance device", or the plural of same, refers to any shipment conveyance devices, pallets, containers, refrigerated containers, protective containers, railroad contained, tractor trailer containers, air freight containers, marine vessel shipment containers, totes, boxes, envelopes, bags, canvas bags, luggage, baggage, and/or any shipment conveyance structures or apparatuses, of any size, kind, or type.

As used herein, the terms "sender", "sending entity", "shipper", or the plural of same, refers to any senders, sending entities, shippers, shipper entities, merchants, vendor, goods providers, products providers, services providers, individuals, or entities, or the employees or agents of same, who or which can provide for a shipment or any good(s), product(s), or service(s).

As used herein, the terms "carrier", "transporter", "shipper", "shipping service provider", "deliverer", delivery provider", or like entity, or the plural of same, refers to any carriers, transporters, shippers, shipping service providers, deliverers, delivery providers, individuals, entities, or like entities, or the employees or agents of same, who or which provide for the shipment, transport, or delivery, via any one or more of ground or land transportation, rail transportation, water or sea transportation, air transportation, underwater transportation, and/or manned and/or unmanned transportation, of any of the herein-described goods, products, and/or services, which are described herein as being shipped or sent by any of the herein-described senders or sending entities.

As used herein, the terms "receiver", "receiving entity", or the plural of same, refers to any receivers, receiving entities, customers, clients, individuals, entities, and/or other like entities, or the employees or agents of same, who or which receive any of the herein-described goods, products, and/or services, which are described herein as being shipped or sent by any of the herein-described senders or sending entities.

As defined herein, the terms "operator", "administrator", or like entity, or the plural of same, refers to any operators, administrators, individuals, or entities, or the employees or agents of same, who or which operate, or administer the operation of, any of the central processing computers and/or the apparatus and method of the present invention.

Applicant hereby incorporates by reference herein the subject matter and teachings of U.S. Provisional patent application Ser. No. 60/263,877 which teaches and discloses an apparatus and method for providing shipment information.

FIG. 1 illustrates a system in which the apparatus and method of the present invention can be utilized. The system of FIG. 1 is designated generally by the reference numeral 100. The system 100 of FIG. 1 includes a shipment conveyance device, a pallet, a container, a tote, and/or any shipment conveyance structure 10 (hereinafter referred to as a "shipment conveyance device 10", "pallet 10", or "container 10". The system 100 also includes a shipment conveyance device computer 20 which can be attached to, built into, integrated into, and/or located inside, the shipment conveyance device 10.

With reference to FIG. 1, the system 100 also includes a carrier computer or communication device 30 (hereinafter referred to as the "carrier computer 30") which is associated with the carrier which is utilized to transport the shipment conveyance device 10. The carrier computer 30 can be any one or more of a computer, a computer system, a group of computers, a telephone, a personal computer, a wireless telephone, a personal digital assistant, a video telephone, a personal communication device, a wireless device, a handheld device, a palm-top device, and/or any other communication device(s) and/or computer(s).

The carrier computer 30 can be located at, or in, the carrier vehicle. The carrier computer 30 can also be located at, or in, a regional or central carrier office. The carrier computer 30 can also be a wireless or hand-held device which can be a mobile device.

With reference to FIG. 1, the system 100 also includes a sender or shipping entity computer or communication device 40 (hereinafter referred to as the "sender computer 40") which is associated with the a sender or shipping entity who or which is effecting shipment of the respective goods, products, items, entities, objects, and/or any other entities, which can be shipped on, in , or in conjunction with, the shipment conveyance devices 10.

The sender computer 40 can be any one or more of a computer, a computer system, a group of computers, a telephone, a personal computer, a wireless telephone, a personal digital assistant, a video telephone, a personal communication device, a wireless device, a handheld device, a palm-top device, and/or any other communication device(s) and/or computer(s).

With reference to FIG. 1, the system 100 also includes a receiver or receiving entity computer or communication device 50 (hereinafter referred to as the "receiver computer 50") which is associated with the a receiver or receiving entity who or which is receiving shipment of the respective goods, products, items, entities, objects, and/or any other entities, which can be shipped on, in, or in conjunction with, the shipment conveyance devices 10.

The receiver computer 50 can be any one or more of a computer, a computer system, a group of computers, a telephone, a personal computer, a wireless telephone, a personal digital assistant, a video telephone, a personal communication device, a wireless device, a handheld device, a palm-top device, and/or any other communication device(s) and/or computer(s).

With reference to FIG. 1, the system 100 also includes a central processing computer 60 which can be utilized to administer, manage, and/or control, the operation of the system 100 and/or any of the shipment conveyance device computers 20, the carrier computers 30, the sender computers 40, and/or the receiver computers 50, described herein.

The central processing computer 60 can be a computer, a computer system, a network computer, a server computer, and/or a communication device, and/or any combination of same.

The central processing computer 60 can service any number of the herein-described shipment conveyance devices 10, shipment conveyance device computers 20, carrier computers 30, sender computers 40, and/or receiver computers 50.

The system 100 can include any number of shipment conveyance devices 10, shipment conveyance device computers 20, carrier computers 30, sender computers 40, receiver computers 50, and/or central processing computers 60.

The herein-described shipment conveyance device computers 20, carrier computers 30, sender computers 40, receiver computers 50, and/or central processing computers 60, can communicate with, transmit information to, and/or receive information from, any shipment conveyance device computers 20, carrier computers 30, sender computers 40, receiver computers 50, and/or central processing computers 60, over any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

The system 100 can be utilized on, over, and/or in conjunction with, any suitable communication network or system, including, but not limited to a telephone network, a telecommunication network, a digital communication network, a satellite communication network, a wireless communication network, a personal communication services network, a broadband communication network, a bluetooth communication network, the Internet, the World Wide Web, and/or any other communication network and/or system.

Any of the carrier computers 30, sender computers 40, receiver computers 50, and/or central processing computers 60, can include, where appropriate and/or where suitable, a central processing unit (CPU), a random access memory (RAM), a read only memory (ROM), an input device, a reading or scanning device, a display device, a receiver, a transmitter, a database, and an output device. Any of the carrier computers 30, sender computers 40, and/or receiver computers 50, can also contain any other devices or peripherals needed and/or desired for programming the shipment conveyance computers 20, depositing or programming information into the shipment conveyance computers 20, and/or reading or extracting information from the shipment conveyance computers 20.

Figure 2:
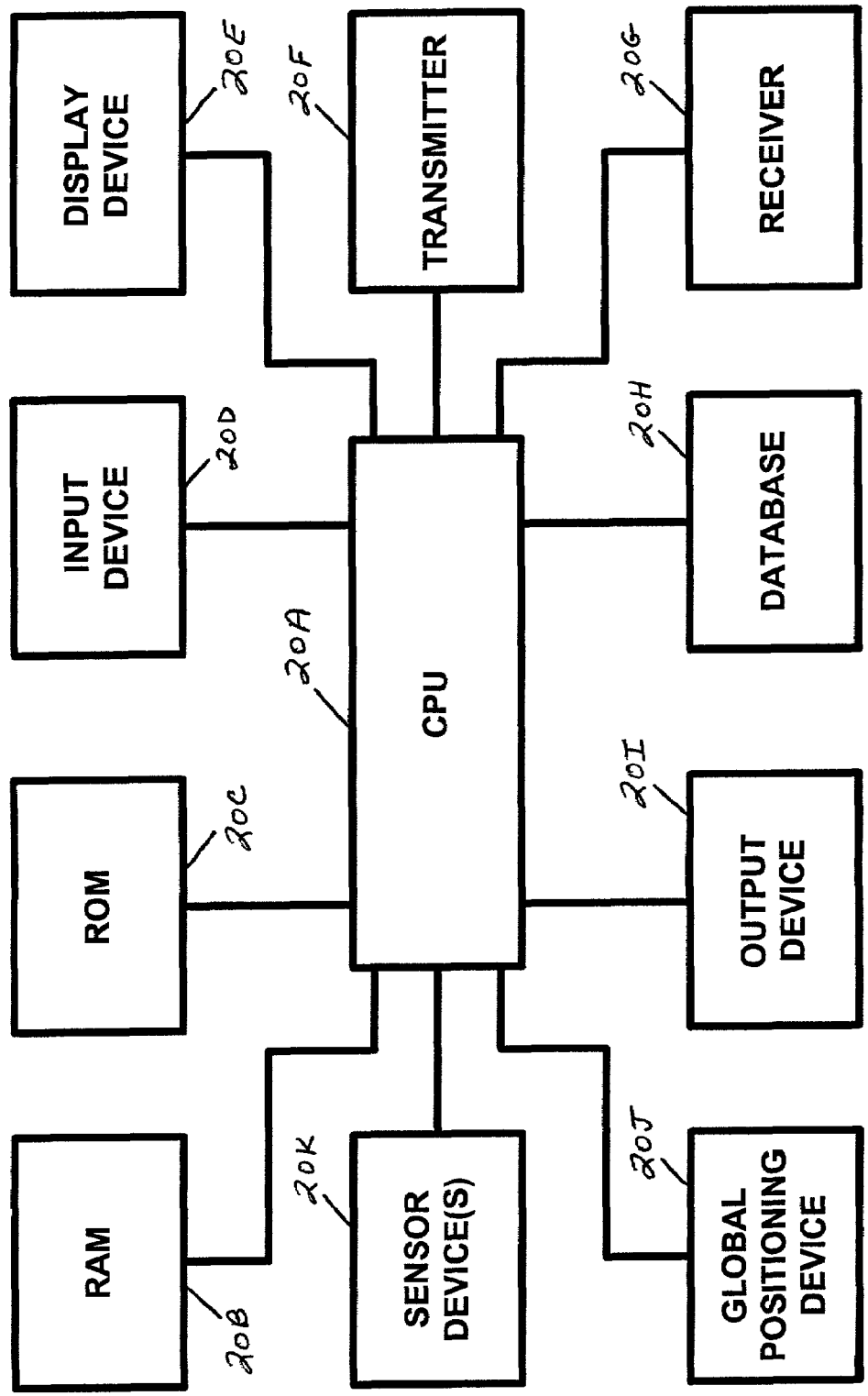
FIG. 2 illustrates the shipment conveyance device computer of FIG. 1, in block diagram form.

FIG. 2 illustrates the shipment conveyance device computer 20 of FIG. 1, in block diagram form. The shipment conveyance device computer 20 can provide and/or perform any of the processing routines or functionality described herein.

With reference to FIG. 2, the shipment conveyance device computer 20 includes a central processing unit or CPU 20A, which in the preferred embodiment, is a microprocessor. The CPU 20A can also be a microcomputer, a minicomputer, a macro-computer, and/or a mainframe computer, depending upon the application.

The shipment conveyance device computer 20 also includes a random access memory device(s) 20B (RAM) and a read only memory device(s) 20C (ROM), each of which is connected to the CPU 20A.

The shipment conveyance device computer 20 can also include an input device 20D, for entering data, information, and/or commands into the shipment conveyance device computer 20. The input device can be or can include any one of more of a keyboard, a pointing device, such as, for example, a mouse or a touch pad, etc., a scanner, a scanning device, a reading device for reading data and/or information provided from a scanner, a data and/or information reading device, a reader, a card reader, a magnetic stripe card reader, a bar code reader, an optical reader, and/or any other input device for entering and/or for receiving data and/or information in any form, including, but not limited to, electronic form, optical from, magnetic form, and/or in any other suitable form or format. The input device(s) is also connected to the CPU 20A.

The shipment conveyance device computer 20 can also include a display device 20E, such as, for example, a display screen or device for displaying data and/or information to a user or other individual. The display device can be a display screen, a liquid crystal display screen, a light emitting diode screen, and/or any other appropriate and/or suitable display device or display screen. The display device 20E can display any of the herein-described data and/or information which is described herein as being input into, processed by, and/or output from, the shipment conveyance device computer 20.

The shipment conveyance device computer 20 also includes a transmitter(s) 20F, for transmitting signals and/or data and/or information from the shipment conveyance device computer 20 to any one or more of the carrier computers 30, the sender computers 40, the receiver computers 50, the central processing computers 60, and/or any of the other shipment conveyance device computers 20 described herein.

The shipment conveyance device computer 20 also includes a receiver 20G, for receiving signals and/or data and/or information from any one or more of the carrier computers 30, the sender computers 40, the receiver computers 50, the central processing computers 60, and/or any of the other shipment conveyance device computers 20 described herein.

With reference to FIG. 2, shipment conveyance device computer 20 also includes a database 20H. The database 20H can contain any data, information, software programs, software algorithms, and/or any other information needed and/or desired for performing any of the processing routines and/or functionality described herein as being performed by the shipment conveyance device computer(s) 20 and/or by the system 100.

The database 20H can contain data and/or information regarding and/or relating to the respective goods, products, items, entities, objects, and/or any other entities which are being shipped and/or transported via the respective shipment conveyance device 10, including, but not limited to, a description of the respective goods, products, items, entities, objects, and/or any other entities, the quantity of the respective goods, products, items, entities, objects, and/or any other entities, the sender or shipper of the respective goods, products, items, entities, the origination of the respective goods, products, items, entities, objects, and/or any other entities, the receiver or receiving entity of the respective goods, products, items, entities, objects, and/or any other entities, the destination of the respective goods, products, items, entities, objects, and/or any other entities, the cost, value, or price, of the respective goods, products, items, entities, objects, and/or any other entities, the shipping cost of the respective goods, products, items, entities, objects, and/or any other entities, the carrier, transporter, or deliverer, of the respective goods, products, items, entities, objects, and/or any other entities, special instructions regarding the shipment, carriage, or transportation, of the respective goods, products, items, entities, objects, and/or any other entities, and handling instructions regarding and/or pertaining to the respective goods, products, items, entities, objects, and/or any other entities, shipping, delivery, and/or travel.

The database 20H can also contain data and/or information regarding the shipment, handling, or delivery, instructions regarding the respective goods, products, items, entities, objects, and/or any other entities. For example, the database 20H can also contain information regarding whether the respective goods, products, items, entities, objects, and/or any other entities, is or are perishable, is or are fragile, must be heated, must be refrigerated, temperature requirements during shipment, etc. The database 20H can also contain loading and/or unloading, as well as, handling instructions during shipment, for any of the respective goods, products, items, entities, objects, and/or any other entities.

The database 20H can also contain data and/or information regarding invoice information regarding the shipment or delivery of the respective goods, products, items, entities, objects, and/or any other entities, packing slip information regarding the respective goods, products, items, entities, objects, and/or any other entities, insurance information regarding the respective goods, products, items, entities, objects, and/or any other entities, and expected or projected delivery time information regarding the respective goods, products, items, entities, objects, and/or any other entities.

The database 20H can also contain data and/or information regarding the form and/or manner of payment and/or payment instructions (i.e. cash on delivery, electronic payment on delivery, allowed credit amount, payment due information, payment due by information, sender's financial account information, etc.).

The database 20H can also contain position information, location information, digitized map data and/or information, and/or any other information which can be utilized by, or in conjunction with, the global positioning device 20J.

The database 20H can also contain data and/or information regarding the location or position of stops made by the carrier, transporter, or deliverer, of the respective shipment conveyance device 10 and/or the shipment conveyance device computer 20, during the transportation of the respective goods, products, items, entities, objects, and/or any other entities, and the respective shipment conveyance device 10, during the shipment, transportation, or delivery, of same from its point of origin to its delivery destination.

The database 20H can also contain data and/or information regarding the travel log for the respective goods, products, items, entities, objects, and/or any other entities, and/or for the respective shipment conveyance device(s) 10, and/or the time in transit, distance traveled, etc., for or regarding the goods, products, items, entities, objects, and/or any other entities, and/or for the respective shipment conveyance device(s) 10. The database 20H can also contain data and/or information regarding the usage history of the respective shipment conveyance device(s) 10, including, but limited to, the time deployed in service, the number of times used, and/or the service time or service history since initial deployment.

The database 20H can also contain data and/or information regarding the maintenance history of the respective shipment conveyance device(s) 10 and/or shipment conveyance device computer 20.

The database 20H can also contain data and/or information, including software programs and/or algorithms, for facilitating communication of the shipment conveyance device computer 20 with any of the herein-described carrier computers 30, sender computers 40, receiver computers 50, central processing computers 60, and/or any other the shipment conveyance device computer 20. The database 20H can also contain data and/or information, including software programs and/or algorithms, for facilitating data and/or information transmission between, from, and/or to, respectively, the shipment conveyance device computer 20 and any of the herein-described carrier computers 30, sender computers 40, receiver computers 50, central processing computers 60, and/or any other the shipment conveyance device computer 20.

The database 20H can also contain an electronic signature, electronic signatures, and/or electronic signature information for, regarding, and/or relating to, any of the herein-described senders, sending entities, shippers, carriers, transporters, delivery service providers, receivers, receiving entities, and/or any other individuals, parties, and/or entities, which or which may utilize the shipment conveyance device computer 20 and/or who or which may be involved in a shipment, transport, and/or delivery, involving same. The electronic signature, electronic signatures, and/or electronic signature information, can be utilized and/or processed in the processing and/or consummation of any transactions involving any respective parties involved in any of the herein-described shipment, transporting, and/or delivery, activities.

The database 20H can also contain electronic payment information, electronic and/or digital money information, payment identification information, credit account information, credit card account information, charge account information, charge card account information, debit account information, debit card account information, electronic money account information, letter of credit information, financial account information, for, corresponding to, and/or relating to, any of respective parties involved in any of the herein-described shipment, transporting, and/or delivery, activities.

The database 20H can also contain any other data and/or information for facilitating the processing of, the consummation of, and/or the execution or, financial transactions between and/or involving any of the respective parties involved in any of the herein-described shipment, transporting, and/or delivery, activities.

The database 20H can also contain any other data and/or information needed and/or desired for facilitating the operation of the apparatus and method of the present invention as described herein.

Any of the herein-described data and/or information which can be stored in the database 20H can be input into the shipment conveyance device computer 20 and/or can be programmed into and/or pre-stored in the database 20H.

With reference once again to FIG. 2, the shipment conveyance device computer 20 can also include an output device 20I such as a printer, a modem, a fax/modem, a reader/transmitter device for providing data and/or information to an external scanner, a reader, or other reading and/or receiving device, a card reader/transmitter device for providing data and/or information to an external scanner, a card reader/transmitter device for providing data and/or information to an external scanner, a reader, or other reading and/or receiving device, a magnetic card reader/transmitter device for providing data and/or information to an external scanner, a reader, or other reading and/or receiving device, an optical card reader/transmitter device for providing data and/or information to an external scanner, a reader, or other reading and/or receiving device, an electronic data reader/transmitter device for providing data and/or information to an external scanner, a reader, or other reading and/or receiving device, a reader/transmitter device for providing data and/or information to an external scanner, a reader, or other reading and/or receiving device, and/or any other reading and/or receiving device and/or output device, for outputting information to any one or more of a carrier, a shipper, a transporter, a sender, and/or a receiver, and/or any respective reading or scanning device associated therewith or utilized thereby, who or which utilizes the apparatus and method of the present invention.

The output device 20I can also be a programmable bar code display device or other code display device which can be displayed and which can be reader by an appropriate bar code reader or code reader. In the preferred embodiment, the bar code display device or other code display device can provide a code, bar code or otherwise, through a glare-proof screen. The bar code or other code can be provide information regarding the data and/or information being output from the shipment conveyance device computer 20.

The displayed code can also be a dynamically changing code which can contain the data and/or information which is currently being output. In this regard, for example, the shipment conveyance device computer 20 can output various data and/or information via the same output device 20I by utilizing a multitude of bar codes or codes.

The output device 20I can also be a speaker for providing an audio signal or audible stimulus, indication, and/or information, to a user and/or can also be a light or lighting device for providing a visual signal or visual stimulus, indication, and/or information, to a user.

The shipment conveyance device computer 20 can also include a global positioning device 20J which can be utilized in order to determine the position and/or location of the shipment conveyance device computer 20.

The shipment conveyance device computer 20 can also include a sensor device 20K which can be any one of more of a thermometer for measuring and/or monitoring shipping temperature, a shock detection device for measuring and/or monitoring shocks, impacts, and/or other forces which may be exerted on the shipment conveyance device 10, and/or a proximity detection device for monitoring and/or detecting the physical proximity of the shipment conveyance device 10 and/or the shipment conveyance device computer 20 with any one or more of any other shipment conveyance device 10, shipment conveyance device computer 20, carrier computer 30, sender computer 40, and/or receiver computer 50.

The sensor device 20K can also include multiple sensing elements which can be placed at various locations in, on, and/or in conjunction with the shipment conveyance device 10. Each of the multiple sensing elements can be utilized in order to sense or detect if the shipment conveyance device 10 has been damaged and/or broken and/or otherwise compromised.

The apparatus and method of the present invention, and/or particular, the shipment conveyance device computer 20, can be utilized on, in, and/or in conjunction with shipment conveyance devices, pallets, containers, refrigerated containers, protective containers, totes, boxes, envelopes, bags, canvas bags, and/or any shipment conveyance structures or apparatuses, of any size, kind, or type.

The apparatus and method of the present invention can be utilized on, in, and/or in conjunction with shipment conveyance devices can also be cargo containers or any type, kind, shape, or size, which can be utilized trucks, cars, vehicles, trains, boats, ships, marine vessels, aircraft, airplanes, of any kind or type for performing ground, sea and air, transport. The shipping conveyance device computer 20 can be attached to, built into, integrated with, and/or placed inside, the shipping conveyance device 10. For example, the shipping conveyance device computer 20 can be built into, or be an integrated component of, a pallet, container, or shipping structure. The shipping conveyance device computer 20 can also be inside a box, container, tote bag, canvas tote bag, piece of baggage, etc. so as to be placed with the contents of the shipment.

Figure 3:
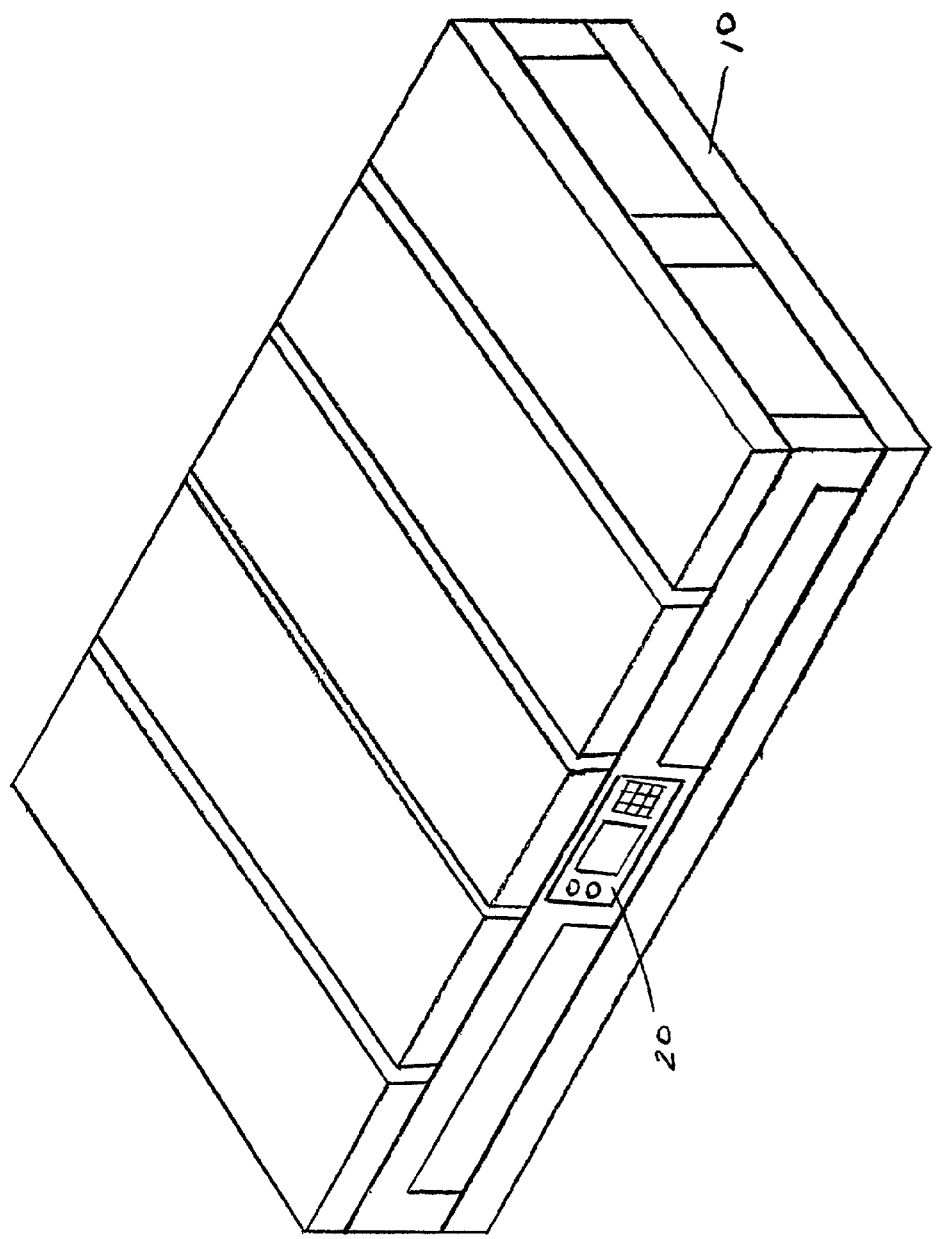
FIG. 3 illustrates a pallet in conjunction with which the shipment conveyance device computer, and/or the system of the present invention, can be utilized.

FIG. 3 illustrates a pallet in conjunction with which the shipment conveyance device computer 20, and/or the system 100 of the present invention, can be utilized. The pallet can be constructed and/or manufactured from plastic, rubber, wood, metal, and/or any other suitable material(s), combination of the above-described materials, and/or composites of the above-described materials.

The pallet illustrated in FIG. 3 is an example of a pallet with which the apparatus and method of the present invention can be utilized. The apparatus and method of the present invention can also be utilized with pallets of any kind, type, shape, or size.

In the preferred embodiment, the shipment conveyance device computer 20 can be placed in any portion or member of the pallet, in a recessed or molded space in or on any portion or member of the pallet. For example, a member component of the pallet can be manufactured such that the shipment conveyance device computer 20 can be placed thereon or thereon in any appropriate manner. In a preferred embodiment, the shipment conveyance device computer 20 can be placed or located in a manner so as to avoid damage thereto or interference therewith.

In the preferred embodiment of FIG. 3, the shipment conveyance device computer 20 is located at the position shown on the pallet 10.

Figure 4:
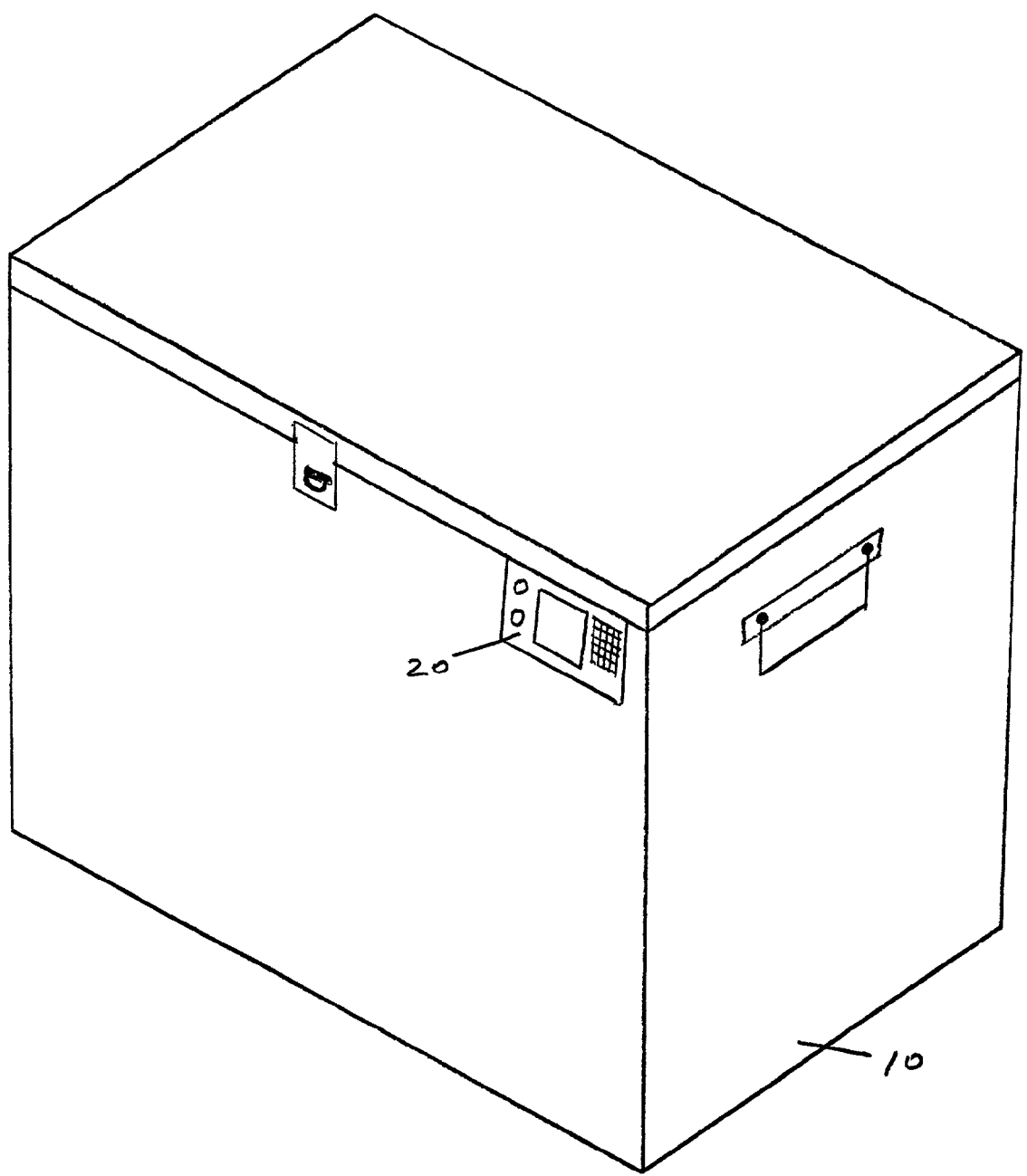
FIG. 4 illustrates a container in conjunction with which the shipment conveyance device computer, and/or the system of the present invention, can be utilized.

FIG. 4 illustrates a container in conjunction with which the shipment conveyance device computer 20, and/or the system 100 of the present invention, can be utilized. The container can be constructed and/or manufactured from plastic, rubber, wood, metal, and/or any other suitable material(s), combination of the above-described materials, and/or composites of the above-described materials. The container can be any type of container and can be a general purpose container, a refrigerated container, a heated container, an insulated container and/or any other type of container which can be utilized in order to ship any of the herein-described goods, products, items, entities, objects, and/or any other entities which can be shipped and/or transported via any of the herein-described shipment conveyance devices, pallets, containers, totes, and/or any shipment conveyance structures or apparatuses.

The container illustrated in FIG. 4 is an example of a container with which the apparatus and method of the present invention can be utilized. The apparatus and method of the present invention can also be utilized with containers of any kind, type, shape, or size.

In the preferred embodiment, the shipment conveyance device computer 20 can be placed in any portion or member of the container, in a recessed or molded space in or on any portion or member of the container. For example, a member component of the container can be manufactured such that the shipment conveyance device computer 20 can be placed thereon or thereon in any appropriate manner. In a preferred embodiment, the shipment conveyance device computer 20 can be placed or located in a manner so as to avoid damage thereto or interference therewith.

In the preferred embodiment of FIG. 4, the shipment conveyance device computer 20 is located at the position shown on the container 10.

The apparatus and method of the present invention, as well as the system 100 of the present invention can be utilized in a number of preferred embodiments in order to provide shipment information.

The present invention, in a preferred embodiment, can be utilized in order to provide information regarding a shipment or delivery to any one or more of a carrier or transporter of the shipment, to the receiver or receiving entity of the shipment, and/or to the central processing computer 60 and/or to the operator or administrator of the system of the present invention.

Figure 5:
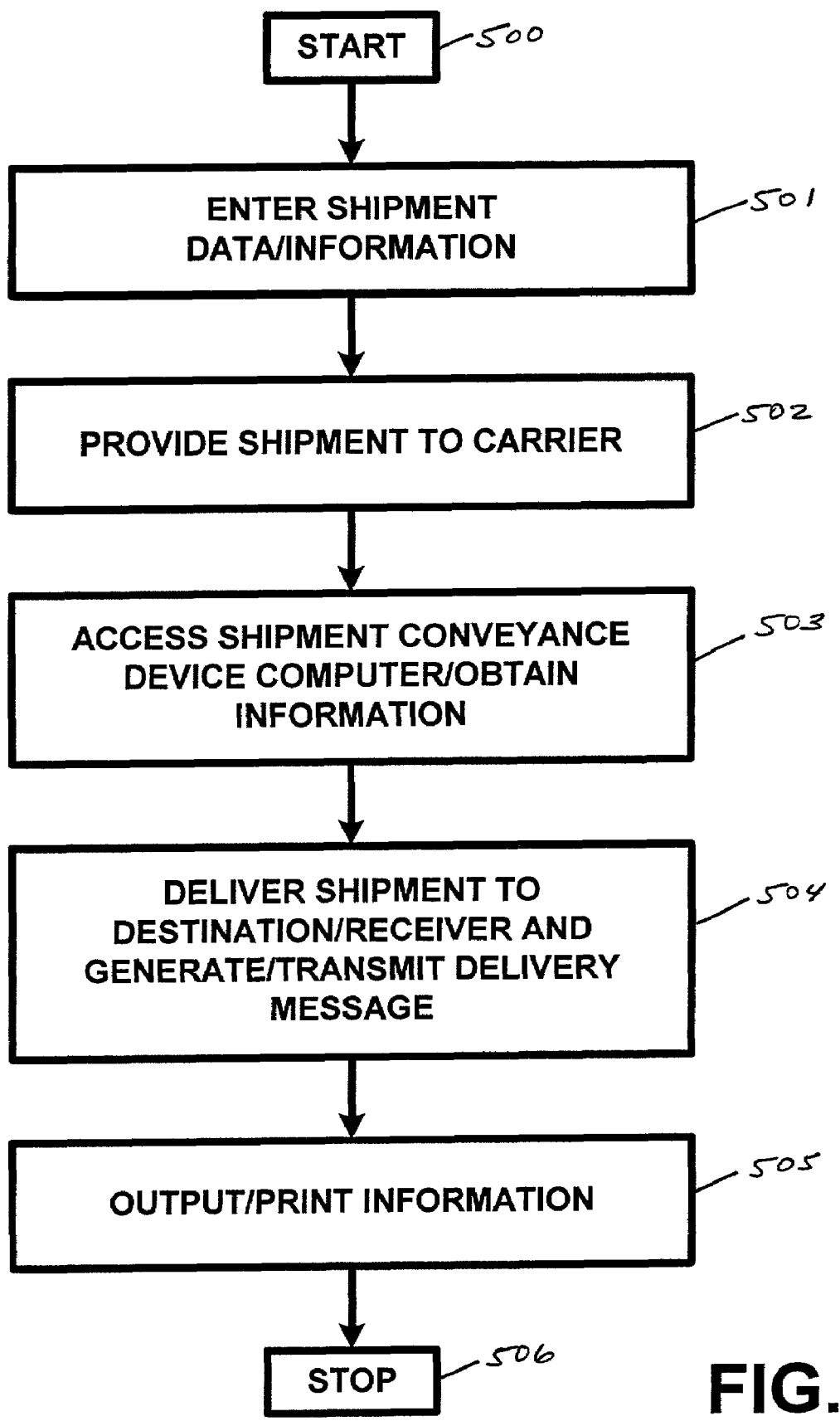
FIG. 5 illustrates a preferred embodiment method for utilizing the apparatus and method of the present invention, in flow diagram form.

FIG. 5 illustrates a preferred embodiment method for utilizing the apparatus and method of the present invention, in flow diagram form. In the embodiment of FIG. 5, the sender of a shipment of goods, products, items, entities, objects, and/or any other entities, can store information regarding the shipment in the shipment conveyance device computer 20.

The sender can input information into the shipment conveyance device computer 20 manually via the input device 20D, electronically via the receiver 20G, and/or via any combination of manual data entry and electronic data entry.

The information can thereafter be retrieved by the carrier of the shipment and/or by the receiver of the shipment. With reference to FIG. 5, the operation of the system 100 commences at step 500.

At step 501, the sender of the shipment can load the respective goods, products, items, entities, objects, and/or any other entities, onto or into the shipment conveyance device 10 which can, for example, be a pallet or container.

At step 501, the sender can also enter data and/or information concerning or pertaining to the shipment into the shipment conveyance device computer 20. The data and/or information which is entered into the shipment conveyance device computer 20 can be any of the data and/or information described herein as being stored in the database 20H. In this regard, the sender can enter data and/or information regarding and one or more data and/or information regarding and/or relating to the respective goods, products, items, entities, or objects, a description of the respective goods, products, items, entities, or objects, the quantity of the respective goods, products, items, entities, or objects, the sender or shipper of the respective goods, products, items, entities, or objects, the origination of the respective goods, products, items, entities, or objects, the receiver or receiving entity of the respective goods, products, items, entities, or objects, the destination of the respective goods, products, items, entities, or objects, the cost, value, or price, of the respective goods, products, items, entities, or objects, the shipping cost of the respective goods, products, items, entities, or objects, the carrier, transporter, or deliverer, of the respective goods, products, items, entities, or object, and/or special instructions regarding the shipment, handling, carriage, or transportation, of the respective goods, products, items, entities, or objects.

The sender can also enter data and/or information regarding any one or more of invoice information regarding the shipment or delivery of the respective goods, products, items, entities, or objects, packing slip information regarding the respective goods, products, items, entities, or objects, insurance information regarding the respective goods, products, items, entities, or objects, expected or projected delivery time information regarding the shipment, position information, location information, digitized map data and/or information, information regarding the location or position of stops made by the carrier, transporter, or deliverer, of the shipment, electronic signature, electronic signatures, and/or electronic signature information for, regarding, and/or relating to, any of the herein-described senders, sending entities, shippers, carriers, transporters, delivery service providers, receivers, receiving entities, and/or any other individuals, parties, and/or entities, which or which may involved in the shipment as a sender, carrier, and/or receiver.

The sender can also enter data and/or information regarding any one or more of data and/or information regarding the from and/or manner of payment and/or payment instructions (i.e. cash on delivery, electronic payment on delivery, allowed credit amount, payment due information, payment due by information, sender's financial account information, etc.), electronic payment information, electronic and/or digital money information, payment identification information, credit account information, credit card account information, charge account information, charge card account information, debit account information, debit card account information, electronic money account information, letter of credit information, financial account information, for, corresponding to, and/or relating to, any of respective parties involved in shipment.

The data and/or information entered into the shipment conveyance device computer 20, at step 501, can be processed and/or stored in the database 20H. At step 502, the shipment conveyance device 10 is provided to the carrier. At step 503, the shipment conveyance device 10 can be transported to its destination.

At any time during the transport of the shipment conveyance device, at step 503, any one or more of the carrier, the sender, the receiver, and/or the central processing computer administrator, can access the shipment conveyance computer 20 via the respective carrier computer(s) 30, sender computer(s) 40, receiver computer(s) 50, central processing computer(s) 60.

At any time, the sender can also access the shipment conveyance device computer 20 via the respective sender computer 40 and transmit data and/or information to the shipment conveyance device computer 20. The sender can transmit new data and/or information, and/or changes and/or updates to previously entered data and/or information, to the shipment conveyance device computer 20. The data and/or information, or changes and/or updates thereto, which can be entered and/or transmitted by the sender computer 40 to the shipment conveyance device computer 20 can be any of the data and/or information described herein as being entered and/or provided by the sender and/or can be any data and/or information which is described as being stored in the database 20H.

The respective carrier, sender, receiver, or administrator, can obtain any of the herein-described information which is stored in the shipment conveyance device computer 20, any of the herein-described data and/or information which is entered into the shipment conveyance device computer 20 at the time or point of shipment, position or location information and/or global positioning information of the shipment, information regarding the state of the shipment which can include the temperature of the shipment, shock damage to the shipment, time left to spoilage, damage to the shipment conveyance device 10, and/or any other information which can be detected, obtained, and/or processed by, the shipment conveyance device computer 20. For example, the respective carrier, sender, receiver, or administrator, can ascertain where a shipment is, the carrier containing the shipment, the location of the shipment, the contents of the shipment, the physical state or condition of the shipment and/or any other information which can be provided by the shipment conveyance device computer 20 and/or the system of the present invention.

At step 503, the shipment conveyance device computer 20 can also provide status updates to any one or more of the carrier, the sender, the receiver, and/or the administrator, which can contain any of the above-described information which is described herein as being obtained by any of the respective entities or individuals. For example, the shipment conveyance device computer 20 which can be programmed to provide shipment location updates, shipment status updates, etc., can generate status messages regarding its position or locations, stops made by the carrier, and/or the temperature of the shipment, impacts received by the shipment conveyance device 10, and/or other information.

The status messages can be generated and transmitted to the respective carrier computer 30, the sender computer(s) 40, the receiver computer(s) 50, and/or the central processing computer(s) 60, at pre-designated time intervals, and/or upon the occurrence of a pre-specified event (i.e. a stop made by the carrier, an impact during an accident, an unusual stopping period, a shipment temperature change, and/or any other event or occurrence relating to the shipment).

At step 504, the shipment is delivered to its destination where it can be received by the receiver or by the receiver's agent. At step 504, the carrier and/or the receiver can access the shipment conveyance device computer 20 can obtain, retrieve, and/or download, any of the data and/or information stored in the database 20H of same. The data and/or information can, for example, be information regarding the contents and/or subject matter of the shipment, invoice information, packing slip information, sender information, carrier information, special instructions regarding the shipment and/or payment therefor, a payment receipt, and/or any other information which can be provided to a carrier or a receiver of a shipment.

The carrier or receiver can also obtain any of the herein-described information which can be stored in and/or processed by the shipment conveyance device computer 20. In this regard, the carrier or the receiver can retrieve or download any shipment information from the shipment conveyance device computer 20 and/or from the shipment conveyance device 10 carrying the shipment.

At step 504, the shipment conveyance device computer 20 can also generate a shipment delivery message and transmit same, in any appropriate form or manner, to any one or more of the carrier computer(s) 30, the sender computer(s) 40, the receiver computer(s) 50, and/or the central processing computer(s) 60.

At step 505, any of the information obtained, retrieved, and/or downloaded, at step 504, can be output and/or printed, in hard copy form, and/or downloaded and/or stored in electronic form, by or at any of the respective carrier computer 30, and/or the receiver computer 50.

Thereafter, the operation of the system will cease at step 506.

In the preferred embodiment of FIG. 5, as well as in any and/or all of the other embodiments described herein, any of the messages generated and transmitted by the shipment conveyance device computer 20, and/or by any of the other computers 30, 40, 50, and/or 60, can be an e-mail message, an instant messaging service message, a short message, beeper message, pager message, a telephone message, a pre-recorded telephone message, and/or any other electronic message or electronic transmission.

Figure 6:
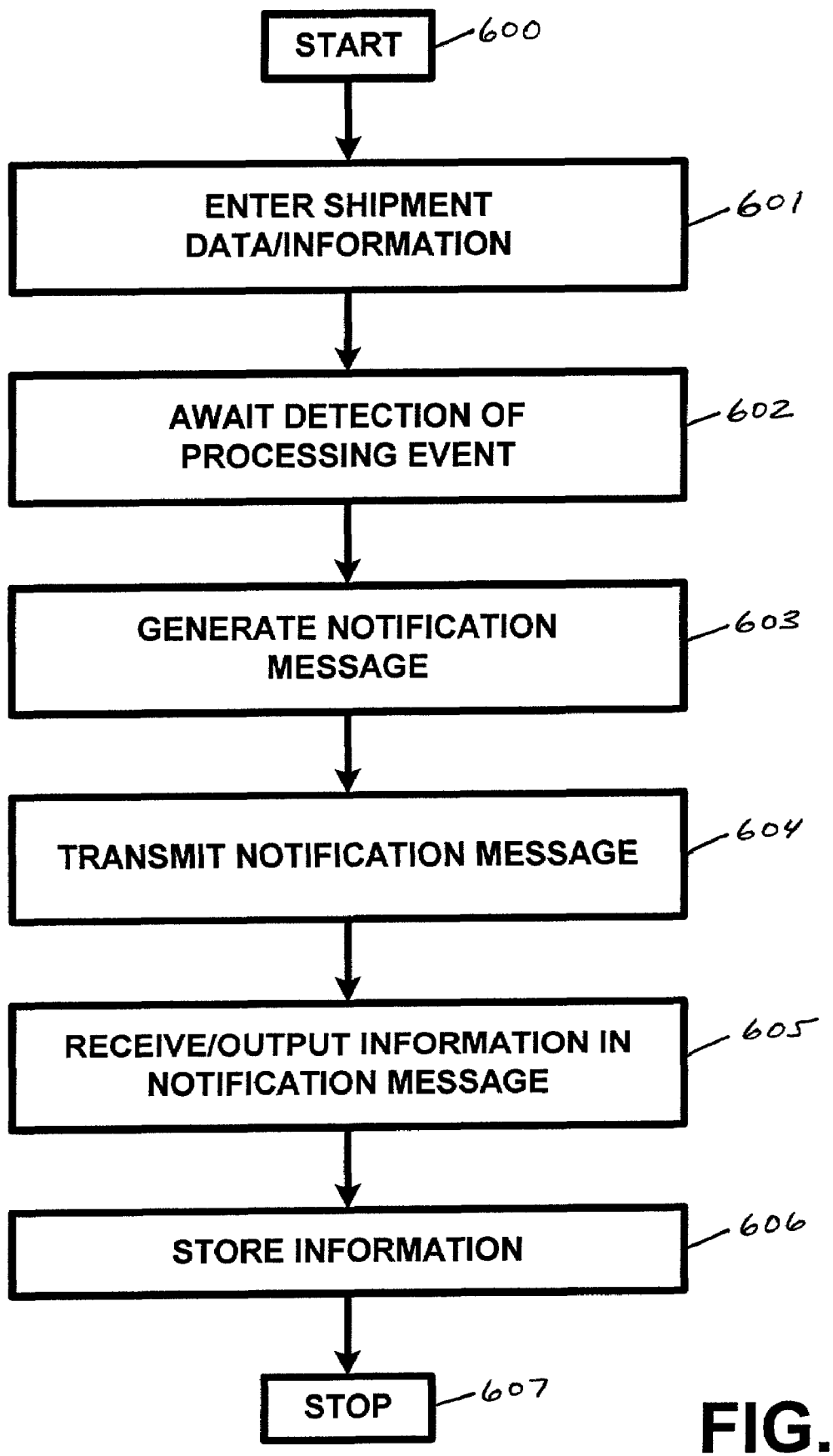
FIG. 6 illustrates another preferred embodiment method of utilizing the apparatus and method of the present invention, in flow diagram form.

In another preferred embodiment, the apparatus and method of the present invention can be utilized in order to provide notification to any one or more of a sender, a carrier, a receiver, and/or an administrator, of any one or more of a lost shipment, an off-track shipment, a delayed shipment, a damaged shipment, and/or a mis-delivered shipment. FIG. 6 illustrates another preferred embodiment method of utilizing the apparatus and method of the present invention, in flow diagram form.

With reference to FIG. 6, the operation of the system 100 commences at step 600. At step 601, the sender can enter or program data and/or information into the shipment conveyance device computer 20 via the sender computer 30 and/or in any other appropriate manner.

The data and/or information can include delivery origin position or location information, destination position or location information, shipment travel route information, including position or location information corresponding to points along the shipment travel route, carrier identification information, carrier code and/or electronic signature information, receiver identification information, receiver code and/or electronic signature information, shipment temperature requirements, shipment impact tolerance information, and/or any other data and/or information regarding and/or relating to the shipment. The data and/or information entered and/or programmed into the shipment conveyance device computer 20 can be processed and stored at step 601.

At step 602, the shipment conveyance device computer 20 can, during transport of the shipment and/or upon the delivery of the shipment to a receiver or receiving entity, await the detection of a processing event.

The processing event can be any one or more of the detection by the shipment conveyance device computer 20 and, in particular, the global positioning device 20J, of a deviation, by more than a pre-designated tolerance amount (i.e. distance measurement, mileage, etc.), of the location or position of the shipment and/or the carrier of same from a pre-determined transportation route (i.e. the shipment carrier is lost, is the wrong carrier, etc.), the detection of an unauthorized and/or the wrong carrier who or which is to transport the shipment (i.e. the detection of an unauthorized carrier code or carrier electronic signature), the detection of an unauthorized and/or the wrong receiver who or which is to receive the shipment and/or the detection of a stolen shipment (i.e. the detection of an unauthorized receiver code or receiver electronic signature, the detection of a shipment being stolen or in the possession of the wrong party, etc.), the detection of a shipment temperature which deviates from the shipment temperature requirements, and/or the detection of an impact or force of impact experienced by the shipment conveyance device 10 (i.e. a mishandling, a dropping, an accident, etc.) experienced by the shipment conveyance device computer 20.

At step 603, the shipment conveyance device computer 20 will generate an appropriate notification message in order to provide notification to any one or more of the carrier, the sender, the receiver, and/or the administrator, of the detected processing event. The notification message can be any one or more of an e-mail message, an instant messaging service message, a short message, beeper message, pager message, a telephone message, a pre-recorded telephone message, and/or any other electronic message or electronic transmission.

At step 604, the notification message is transmitted to any one or more of the carrier computer 30, the sender computer 40, the receiver computer 50, and/or the central processing computer 60.

At step 605, the information contained in the notification message can be received by, and can be output and/or displayed to the respective carrier, sender, receiver, and/or administrator, on, the respective carrier computer 30, the sender computer 40, the receiver computer 50, and/or the central processing computer 60. At step 606, any of the information concerning the shipment and/or the processing event can be stored at the respective carrier computer 30, the sender computer 40, the receiver computer 50, and/or the central processing computer 60. Thereafter, the operation of the system 100 can cease at step 607.

In the preferred embodiment of FIG. 6, as well as in any and/or all of the other embodiments described herein, any of the messages generated and transmitted by the shipment conveyance device computer 20, and/or by any of the other computers 30, 40, 50, and/or 60, can be an e-mail message, an instant messaging service message, a short message, beeper message, pager message, a telephone message, a pre-recorded telephone message, and/or any other electronic message or electronic transmission.

Figure 7A:
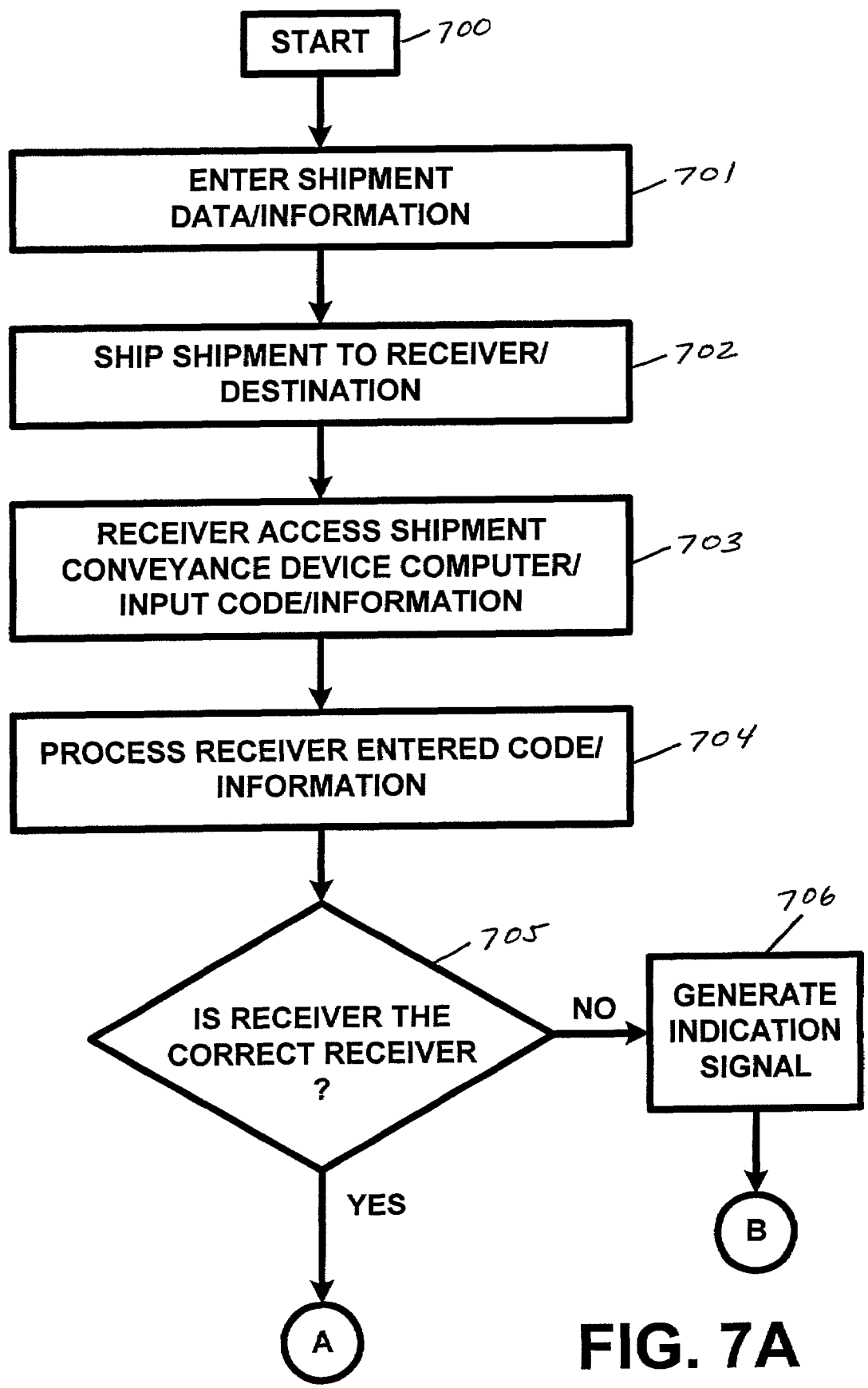
FIGS. 7A and 7B illustrate another preferred embodiment method of utilizing the apparatus and method of the present invention, in flow diagram form.
Figure 7B:
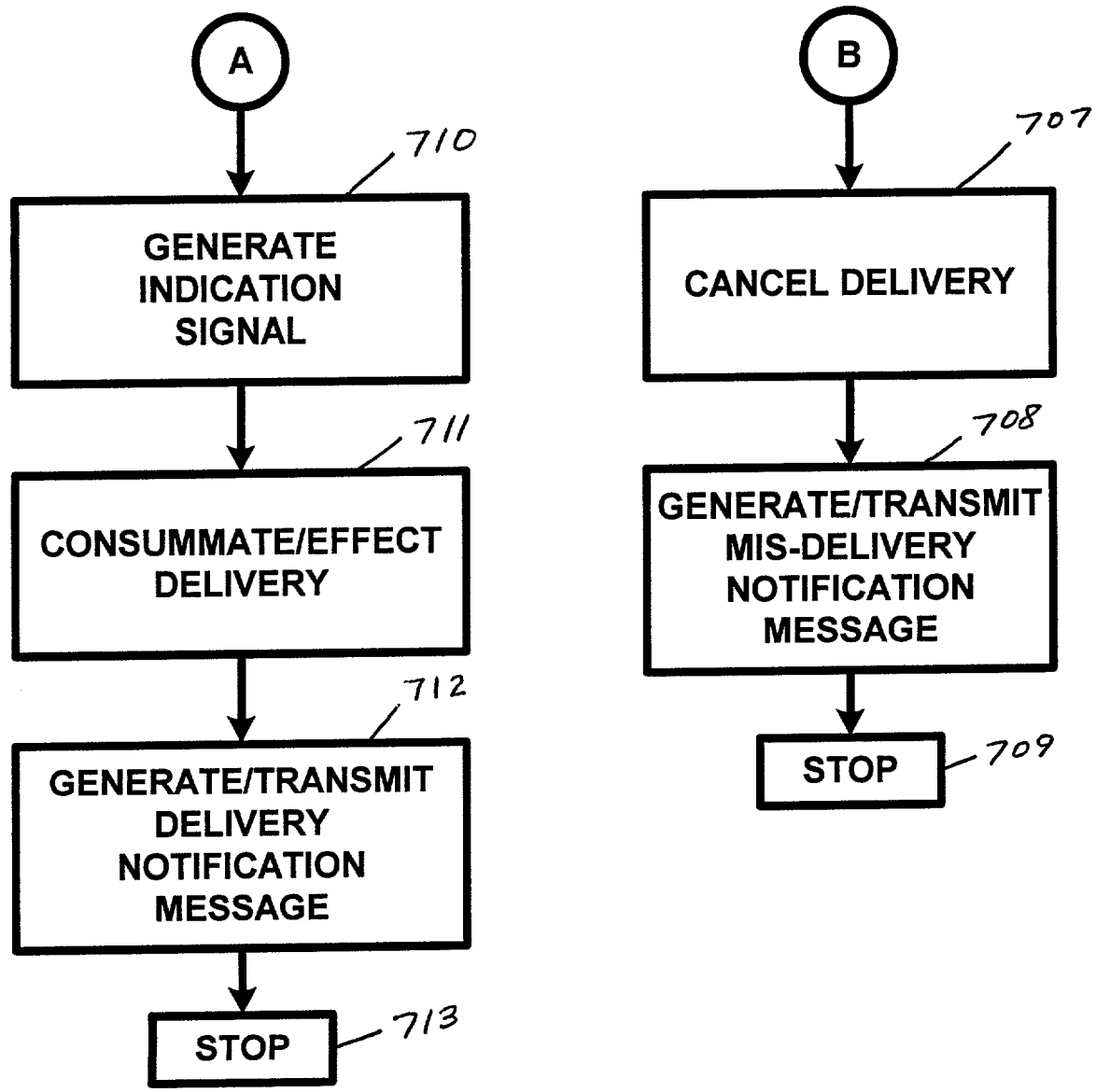

In another preferred embodiment, the apparatus and method of the present invention can be utilized in order to verify that a shipment is being delivered to the proper receiver. FIGS. 7A and 7B illustrate another preferred embodiment method of utilizing the apparatus and method of the present invention, in flow diagram form.

With reference to FIGS. 7A and 7B, the operation of the system 100 commences at step 700. At step 701, the sender can enter or program data and/or information into the shipment conveyance device computer 20 via the sender computer 30 and/or in any other appropriate manner. The data and/or information can include receiver identification information, receiver code and/or electronic signature information, and/or any other of the herein-described data and/or information regarding the shipment. For example, the sender can enter a code or an electronic key or other information which, when processed in conjunction with a code or an electronic key entered by a receiver, upon delivery of the shipment to same, can be utilized in order to verify that the shipment has been delivered to the correct receiver. The data and/or information entered and/or programmed into the shipment conveyance device computer 20 can be processed and stored at step 701.

At step, 702, the shipment conveyance device 10 can be shipped, transported, and/or delivered, to the receiver.

At step 703, the receiver can access the shipment conveyance device computer 20 via a receiver computer 50 and/or via the input device 20D of the shipment conveyance device computer 20. At step 703, the receiver can input its code or electronic key into the shipment conveyance device computer 20. At step 704, the shipment conveyance device computer 20 can process the receiver entered code or electronic key and process same in conjunction with the data and/or information entered into the shipment conveyance device computer 20 by the sender at step 701.

At step 705, the shipment conveyance device computer 20 will determine whether the receiver is the correct receiver for receiving the shipment. If, at step 705, the shipment conveyance device computer 20 determines that the receiver is not the correct receiver of the shipment, the operation of the shipment conveyance device computer 20 will proceed to step 706 and the shipment conveyance device computer 20 will generate an appropriate signal or stimulus which can be provided to the receiver or the carrier. The signal or stimulus can be text information provided on the display device 20E, an audible sound output by the output device 20I, a lighting of a light of the output device 20I, and/or the sounding of an alarm by the output device 20I, and/or any other stimulus indicating that the shipment is not being delivered to the correct receiver.

Thereafter, the shipment conveyance device computer 20 will, at step 707, cancel the delivery to the receiver or party thought to be the receiver. At step 708, the shipment conveyance device computer 20 will generate a mis-delivered notification message indicating that the receiver is not the correct receiver. At step 708, the shipment conveyance device computer 20 will also transmit the mis-delivered notification message to any one or more of the sender, the carrier, the correct receiver, and/or the administrator, and/or to the respective sender computer 40, carrier computer 30, receiver computer 50, and/or the central processing computer 60, indicating that the shipment was mis-delivered, at least for the time being. The carrier can, thereafter, re-attempt the shipment, transport, or delivery, of the shipment conveyance device to the correct receiver. Thereafter, the operation of the system 100 will cease at step 709.

If, however, at step 705, it is determined that the receiver is the correct receiver, the operation of the shipment conveyance device computer 20 will proceed to step 710 and the shipment conveyance device computer 20 will generate an appropriate signal or stimulus which can be provided to the receiver or the carrier. The signal or stimulus can be text information provided on the display device 20E, an audible sound output by the output device 20I, a lighting of a light of the output device 20I, and/or the sounding of an alarm by the output device 20I, and/or any other stimulus indicating that the shipment is being delivered to the correct receiver.

Thereafter, the shipment conveyance device computer 20 can, at step 711, consummate/effect the delivery transaction. At step 712, the shipment conveyance device computer 20 will generate a delivery notification message indicating that the receiver is the correct receiver and/or that delivery of the shipment has been effected. At step 712, the shipment conveyance device computer 20 will also transmit the delivery notification message to any one or more of the sender, the carrier, the correct receiver, and/or the administrator, and/or to the respective sender computer 40, carrier computer 30, receiver computer 50, and/or the central processing computer 60, indicating that the shipment was properly delivered. Thereafter, the operation of the system 100 will cease at step 713.

In the preferred embodiment of FIGS. 7A and 7B, as well as in any and/or all of the other embodiments described herein, any of the messages generated and transmitted by the shipment conveyance device computer 20, and/or by any of the other computers 30, 40, 50, and/or 60, can be an e-mail message, an instant messaging service message, a short message, beeper message, pager message, a telephone message, a pre-recorded telephone message, and/or any other electronic message or electronic transmission.

Figure 8:
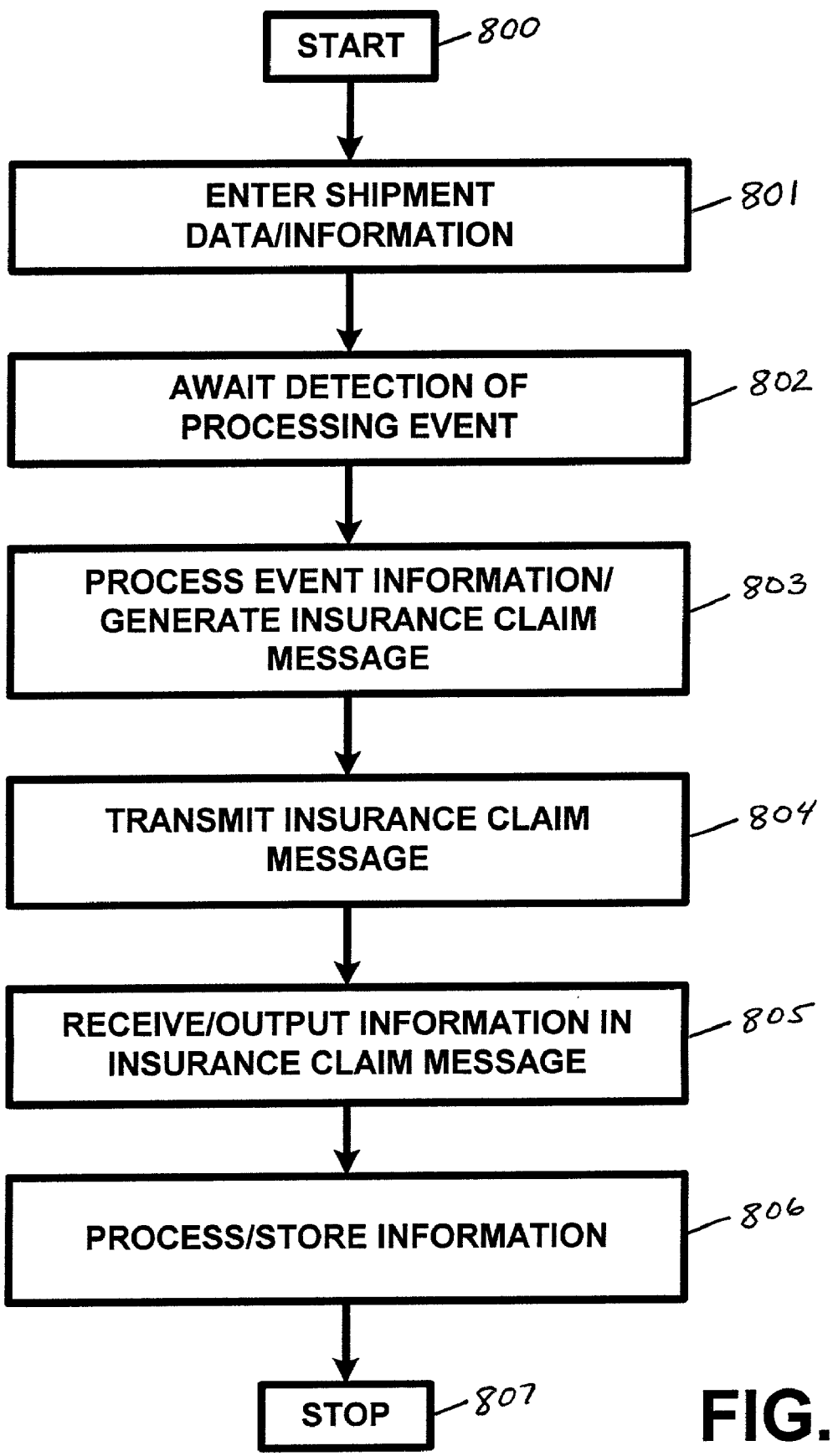
FIG. 8 illustrates another preferred embodiment method of utilizing the apparatus and method of the present invention, in flow diagram form.

In another preferred embodiment, the apparatus and method of the present invention can be utilized in order to generate and/or process information regarding an insurance claim involving a shipment which has been lost, stolen, damaged, and/or mis-delivered, during shipment, transport, and/or delivery, by the carrier. FIG. 8 illustrates another preferred embodiment method of utilizing the apparatus and method of the present invention, in flow diagram form.

With reference to FIG. 8, the operation of the system 100 commences at step 800. At step 801, the sender can enter or program data and/or information into the shipment conveyance device computer 20 via the sender computer 30 and/or in any other appropriate manner. The data and/or information can include delivery origin position or location information, destination position or location information, shipment travel route information, including position or location information corresponding to points along the shipment travel route, carrier identification information, carrier code and/or electronic signature information, receiver identification information, receiver code and/or electronic signature information, shipment temperature requirements, shipment impact tolerance information, shipment insurance information, shipment insurance claim information, shipment insurance claims generation and/or submission information, and/or any other data and/or information regarding and/or relating to the shipment. The data and/or information entered and/or programmed into the shipment conveyance device computer 20 can be processed and stored at step 801.

At step 802, the shipment conveyance device computer 20 can, during transport of the shipment and/or upon the delivery of the shipment to a receiver or receiving entity, await the detection of a processing event.

The processing event can be any one or more of the detection by the shipment conveyance device computer 20 that the shipment has been lost (i.e. there is no record of the shipment being delivered and/or the shipment cannot be found and/or accounted for, etc.), that the shipment has been stolen (i.e. the carrier reports the shipment, and/or the carrier vehicle with the shipment, as being stolen, the carrier has not delivered the shipment to any receiver, and/or an unauthorized individual or entity has received the shipment and refuses to return same, etc.), the shipment has been damaged (i.e. perishable goods have spoiled, perished, and/or been ruined, fragile goods have been damaged, a damaging impact is detected, carrier reports involvement in accident resulting in damage to the shipment and/or shipment contents, etc.) and/or that the shipment has been mis-delivered to an incorrect receiver, receiving entity, individual or entity.

The shipment conveyance computer 20 can detect the processing event itself via any of its herein-described processing capabilities (i.e. detecting erroneous position or location of the shipment or carrier vehicle, detecting status of shipment as contrary to shipping and/or environmental requirements, detecting an impact or damaging forces exerted on the shipment conveyance device 10, detecting mis-delivery, and/or the shipment conveyance device computer 20 can receive data and/or information from any one or more of the carrier computers 30, the sender computers 40, the receiver computers 50, and/or the central processing computers 60, which contains information regarding any of the processing events.

At step 803, the shipment conveyance device computer 20 can process the data and/or information corresponding to the processing event and generate an insurance claim message which contains information regarding the processing event and information for filing an appropriate insurance claim.

At step 804, the shipment conveyance device computer 20 will transmit the insurance claim message to any one or more of the carrier, the sender, the receiver, and/or the administrator, in order to provide information regarding the detected processing event and/or the associated insurance claim. The insurance claim information can be any one or more of an e-mail message, an instant messaging service message, a short message, beeper message, pager message, a telephone message, a pre-recorded telephone message, and/or any other electronic message or electronic transmission.

At step 804, the insurance claim message can be transmitted to any one or more of the carrier computer 30, the sender computer 40, the receiver computer 50, and/or the central processing computer 60. The central processing computer 60 can also be utilized by and/or be associated with an insurance provider and/or an insurance agent.

At step 805, the information contained in the insurance claim message can be received by, and can be output and/or displayed to the respective carrier, sender, receiver, and/or administrator, on, the respective carrier computer 30, the sender computer 40, the receiver computer 50, and/or the central processing computer 60. At step 806, any of the information concerning the insurance claim can be processed and/or stored at the respective carrier computer 30, the sender computer 40, the receiver computer 50, and/or the central processing computer 60. Thereafter, the operation of the system 100 can cease at step 807.

In the preferred embodiment of FIG. 8, any of the insurance claim messages generated and transmitted by the shipment conveyance device computer 20 can be an e-mail message, an instant messaging service message, a short message, beeper message, pager message, a telephone message, a pre-recorded telephone message, and/or any other electronic message or electronic transmission.

The apparatus and method of the present invention can be utilized in order to provide any of the herein-defined shipment conveyance devices with the information processing functionality described herein. In this manner, the present invention can be utilized in order to provide "smart" shipment conveyance devices, "smart" pallets, "smart" containers, etc., or "electronic" shipment conveyance devices, "electronic" pallets, "electronic" containers, etc., which can provide enhanced information services and/or functionality, and/or "smart" or "e-" technologies, in the shipping, transportation, and/or delivery, services fields and/or industries.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. An apparatus, comprising:
a shipment conveyance device, wherein the shipment conveyance device is associated with a shipment, and further wherein the shipment conveyance device is at least one of a shipping container, a pallet, and a tote;
a memory device, wherein the memory device is located in, on, or at, the shipment conveyance device, wherein information regarding the shipment is stored in the memory device, and further wherein the information regarding the shipment includes a description of a good, product, or item, being shipped via the shipment conveyance device, and at least one of origination information, sender information, shipper information, destination information, receiver information, handling instruction information, delivery instruction information, invoice information, packing ship information, delivery time information, and payment instruction information, regarding the shipment;
a global positioning device, wherein the global positioning device is located in, on, or at, the shipment conveyance device, and further wherein the global positioning device determines a position or location of the shipment conveyance device;
a processing device, wherein the processing device processes at least one of information regarding the shipment and information regarding the shipment conveyance device in response to an occurrence of an event or in response to a request for information regarding the shipment or the shipment conveyance device, wherein the processing device generates a message containing information regarding the position or location of the shipment or the shipment conveyance device and information regarding at least one of the occurrence of an event, a status of the shipment, a shipment temperature, and an impact or force on the shipment conveyance device; and
a transmitter, wherein the transmitter is located in, on, or at, the shipment conveyance device, wherein the transmitter transmits the message to a communication device associated with at least one an individual or entity, a sender of the shipment, a receiver of the shipment, a carrier of the shipment, and an individual or entity authorized to receive information regarding the shipment or the shipment conveyance device.

2. The apparatus of claim 1, further comprising:
a display device, wherein the display device is located in, on, or at, the shipment conveyance device, wherein the display device displays or provides information regarding the shipment.

3. The apparatus of claim 1, further comprising:
a receiver, wherein the receiver receives the request for information regarding the shipment or the shipment conveyance device.

4. The apparatus of claim 1, wherein the message contains information regarding a stop made by a carrier of the shipment or the shipment conveyance device.

5. The apparatus of claim 1, further comprising;
a sensor, wherein the sensor monitors or measures at least one of a temperature during the shipment, a shock exerted on the shipment conveyance device, an impact exerted on the shipment conveyance device, and a force exerted on the shipment conveyance device,
wherein the message contains information regarding at least one of a temperature of the shipment, a change in a shipment temperature, and an impact or force exerted on the shipment conveyance device.

6. The apparatus of claim 1, wherein the message contains information regarding an unusual stopping period regarding the shipment.

7. The apparatus of claim 1, wherein the processing device is programmed to automatically generate the message.

8. The apparatus of claim 1, wherein the processing device generates a shipment delivery message, and further wherein the apparatus transmits the shipment delivery message to the communication device.

9. The apparatus of claim 1, wherein the event is a detection of a deviation from a pre-determined transportation route associated with the shipment.

10. The apparatus of claim 1, wherein the event is a detection of an unauthorized carrier or a wrong carrier transporting the shipment or the shipment conveyance device or a detection of an unauthorized receiver of the shipment or the shipment conveyance device or a wrong receiver of the shipment or the shipment conveyance device.

11. The apparatus of claim 1, wherein the event is a detection of a shipment temperature which deviates from a shipment temperature requirement.

12. The apparatus of claim 1, wherein the event is a detection of at least one of an impact experienced by the shipment conveyance device, a force experienced by the shipment conveyance device, a mishandling of the shipment conveyance device, a dropping of the shipment conveyance device, and an accident involving the shipment conveyance device.

13. The apparatus of claim 1, further comprising:
an input device for inputting information regarding a person or entity attempting to receive the shipment or the shipment conveyance device,
wherein the processing device processes the information regarding a person or entity attempting to receive the shipment or the shipment conveyance device and determines whether or not the person or entity is a proper receiver of the shipment or the shipment conveyance device.

14. The apparatus of claim 1, wherein the processing device detects an occurrence giving rise to an insurance claim regarding the shipment, and further wherein the message includes insurance claim information.

15. The apparatus of claim 1, wherein the message is transmitted on or over at least one of the Internet and the World Wide Web.

16. The apparatus of claim 1, wherein the shipping container is at least one of a refrigerated container, a heated container, and an insulated container.

17. The apparatus of claim 1, wherein the communication device is at least one of a wireless device and a personal digital assistant.

18. The apparatus of claim 1, wherein the message contains at least one of information regarding a description of a good, product, or item, being shipped via the shipment conveyance device, origination information regarding the shipment, sender information regarding the shipment, shipper information regarding the shipment, destination information regarding the shipment, receiver information regarding the shipment, handling instruction information regarding the shipment, delivery instruction information regarding the shipment, invoice information regarding the shipment, packing slip information regarding the shipment, delivery time information regarding the shipment, and payment instruction information regarding the shipment.

19. The apparatus of claim 1, wherein the apparatus stores at least one of information regarding a temperature requirement regarding the shipment, digitized map information, information regarding a stop or stops made during a transport of the shipment, and travel route information regarding the shipment.

20. An apparatus, comprising:
a shipment conveyance device, wherein the shipment conveyance device is at least one of a shipping container, a pallet, and a tote;
a memory device, wherein the memory device is located in, on, or at, the shipment conveyance device, wherein information regarding a shipment is stored in the memory device, and further wherein the information regarding a shipment includes a description of a good, product, or item, being shipped via the shipment conveyance device, and at least one of origination information, sender information, shipper information, destination information, receiver information, handling instruction information, delivery instruction information, invoice information, packing slip information, delivery time information, and payment instruction information, regarding the shipment;
a global positioning device, wherein the global positioning device is located in, on, or at, the shipment conveyance device, and further wherein the global positioning device determines a position or location of the shipment conveyance device;
a processing device, wherein the processing device is located in, on, or at, the shipment conveyance device, wherein the processing device processes information regarding the shipment conveyance device in response to an occurrence of an event or in response to a request for information regarding the shipment conveyance device, wherein the processing device generates a message containing information regarding the position or location of the shipment conveyance device and information regarding at least one of the occurrence of an event, a status of the shipment, a shipment temperature, and an impact or force on the shipment conveyance devices; and
a transmitter, wherein the transmitter is located in, on, or at, the shipment conveyance device, wherein the transmitter transmits the message to a communication device associated with at least one of an individual or entity, a sender of the shipment, a receiver of the shipment, a carrier of the shipment, and an individual or entity authorized to receive information regarding the shipment or the shipment conveyance device.

21. An apparatus, comprising:
a shipping container, wherein the shipping container is associated with a shipment;
a memory device, wherein the memory device is located in, on, or at, the shipping container, wherein information regarding the shipment is stored in the memory device, and further wherein the information regarding the shipment includes a description of a good, product, or item, being shipped via the shipping container, and at least one of origination information, sender information, shipper information, destination information, receiver information, handling instruction information, delivery instruction information, invoice information, packing slip information, delivery time information, and payment instruction information, regarding the shipment;
a global positioning device, wherein the global positioning device is located in, on, or at, the shipping container, and further wherein the global positioning device determines a position or location of the shipping container;
a processing device, wherein the processing device processes at least one of information regarding the shipment and information regarding the shipping container in response to an occurrence of an event or in response to a request for information regarding the shipment or the shipping container, wherein the processing device generates a message containing information regarding the position or location of the shipping container and information regarding at least one of the occurrence of an event, a status of the shipment, a shipment temperature, and an impact or force on the shipping container; and a transmitter, wherein the transmitter is located in, on, or at, the shipping container, wherein the transmitter transmits the message to a communication device associated with at least one of an individual or entity, a sender of the shipment, a receiver of the shipment, a carrier of the shipment, and an individual or entity authorized to receive information regarding the shipment or the shipping container.

22. The apparatus of claim 21, further comprising:

a display device, wherein the display device is located in, on, or at, the shipping container, wherein the display device displays or provides information regarding the shipment or the shipping container.

23. The apparatus of claim 21, wherein the message contains information regarding a stop made by a carrier of the shipment or the shipping container.

24. The apparatus of claim 21, further comprising:

a sensor, wherein the sensor monitors or measures at least one of a temperature during the shipment, a shock exerted on the shipping container, an impact exerted on the shipping container, and a force exerted on the shipping container, wherein the message contains information regarding at least one of a temperature of the shipment, a change in a shipment temperature, and an impact or force exerted on the shipping container.

25. The apparatus of claim 21, wherein the message contains information regarding an unusual stopping period regarding the shipment or the shipping container.

26. The apparatus of claim 21, wherein the event is a detection of a deviation from a pre-determined transportation route associated with the shipment or the shipping container.

27. The apparatus of claim 21, wherein the event is a detection of an unauthorized carrier or a wrong carrier transporting the shipment or the shipping container or a detection of an unauthorized receiver of the shipment or the shipping container or a wrong receiver of the shipment or the shipping container.

28. The apparatus of claim 21, wherein the event is a detection of a shipment temperature which deviates from a shipment temperature requirement.

29. The apparatus of claim 21, wherein the event is a detection of at least one of an impact experienced by the shipping container, a force experienced by the shipping container, a mishandling of the shipping container, a dropping of the shipping container, and an accident involving the shipping container.

30. The apparatus of claim 21, wherein the message is transmitted on or over a wireless communication network or on or over at least one of the Internet and the World Wide Web.

* * * * *

UNITED STATES PATENT AND TRADEMARK OFFICE
CERTIFICATE OF CORRECTION

PATENT NO. : 7,253,731 B2 Page 1 of 1
APPLICATION NO. : 10/055116
DATED : August 7, 2007
INVENTOR(S) : Raymond Anthony Joao It is certified that error appears in the above-identified patent and that said Letters Patent is hereby corrected as shown below:

Col. 23, line 65, after "packing", replace "ship" with -- slip --.

Col. 24, line 22, insert -- of -- after "at least one".

Col. 26, line 21, replace "devices" with --device --.

Signed and Sealed this

Sixth Day of May, 2008

JON W. DUDAS
*Director of the United States Patent and Trademark Office*